(12) United States Patent
Kim et al.

(10) Patent No.: US 9,250,900 B1
(45) Date of Patent: Feb. 2, 2016

(54) METHOD, SYSTEM, AND COMPUTER PROGRAM PRODUCT FOR IMPLEMENTING A MICROPROCESSOR WITH A CUSTOMIZABLE REGISTER FILE BYPASS NETWORK

(71) Applicant: Cadence Design Systems, Inc., San Jose, CA (US)

(72) Inventors: James Sangkyu Kim, San Jose, CA (US); Fei Sun, San Jose, CA (US); Kyle Satoshi Tsukamoto, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/503,410

(22) Filed: Oct. 1, 2014

(51) Int. Cl.
*G06F 17/50* (2006.01)
*G06F 9/30* (2006.01)
*G06F 15/76* (2006.01)

(52) U.S. Cl.
CPC ............ *G06F 9/30098* (2013.01); *G06F 15/76* (2013.01)

(58) Field of Classification Search
USPC .......... 716/100, 104, 106, 108, 132; 712/214, 712/217
See application file for complete search history.

(56) References Cited

U.S. PATENT DOCUMENTS

| | | | |
|---|---|---|---|
| 5,361,373 A | 11/1994 | Gilson | |
| 5,450,586 A | 9/1995 | Kuzara et al. | |
| 5,535,331 A | 7/1996 | Swoboda et al. | |
| 5,544,067 A | 8/1996 | Rostoker et al. | |
| 5,555,201 A | 9/1996 | Dangelo et al. | |
| 5,572,437 A | 11/1996 | Rostoker et al. | |
| 5,613,098 A | 3/1997 | Landau et al. | |
| 5,623,418 A | 4/1997 | Rostoker et al. | |
| 5,696,956 A | 12/1997 | Razdan et al. | |
| 5,748,875 A | 5/1998 | Tzori | |
| 5,748,979 A | 5/1998 | Trimberger | |
| 5,801,958 A | 9/1998 | Dangelo et al. | |
| 5,819,050 A | 10/1998 | Boehling et al. | |
| 5,819,064 A | 10/1998 | Razdan et al. | |
| 5,832,205 A | 11/1998 | Kelly et al. | |
| 5,854,929 A | 12/1998 | Van Praet et al. | |
| 5,857,106 A | 1/1999 | Barbour et al. | |
| 5,867,399 A | 2/1999 | Rostoker et al. | |

(Continued)

FOREIGN PATENT DOCUMENTS

| | | |
|---|---|---|
| EP | 0743599 | 11/1996 |
| EP | 0772140 | 5/1997 |

(Continued)

*Primary Examiner* — Brian Ngo
(74) *Attorney, Agent, or Firm* — Vista IP Law Group, LLP

(57) ABSTRACT

Methods and systems for implementing a microprocessor with a selective register file bypass network are disclosed. Late bypasses are removed from a register file bypass network of a microprocessor design. One or more late bypasses are then added back to the register file bypass network based at least in part upon the results of analyzing a plurality of instructions that are to be processed in an instruction pipeline of the microprocessor. An electronic design for at least the register file bypass network is then generated with these one or more late bypasses that are added to the register file bypass network. Without incurring additional hardware or cost for the microprocessor design, one or more bypasses in the register file bypass network may be optionally shared among multiple free-riders, and an entire port stage may also be optionally bypassed to another port stage based upon one or more criteria.

21 Claims, 15 Drawing Sheets

(56) References Cited

U.S. PATENT DOCUMENTS

| | | |
|---|---|---|
| 5,870,588 A | 2/1999 | Rompaey et al. |
| 5,887,169 A | 3/1999 | Lacombe |
| 5,889,990 A | 3/1999 | Coleman et al. |
| 5,896,521 A | 4/1999 | Shackleford et al. |
| 5,918,035 A | 6/1999 | Van Praet et al. |
| 5,933,356 A | 8/1999 | Rostoker et al. |
| 5,995,736 A | 11/1999 | Aleksic et al. |
| 5,999,730 A | 12/1999 | Lewis et al. |
| 5,999,734 A | 12/1999 | Willis et al. |
| 6,006,022 A | 12/1999 | Rhim et al. |
| 6,028,996 A | 2/2000 | Sniderman et al. |
| 6,031,992 A | 2/2000 | Cmelik et al. |
| 6,035,123 A | 3/2000 | Razdan et al. |
| 6,052,524 A | 4/2000 | Pauna |
| 6,058,466 A | 5/2000 | Panwar et al. |
| 6,075,938 A | 6/2000 | Bugnion et al. |
| 6,078,736 A | 6/2000 | Guccione |
| 6,182,206 B1 | 1/2001 | Baxter |
| 6,195,593 B1 | 2/2001 | Nguyen |
| 6,216,216 B1 | 4/2001 | Bonola |
| 6,230,307 B1 | 5/2001 | Davis et al. |
| 6,269,409 B1 | 7/2001 | Solomon |
| 6,275,893 B1 | 8/2001 | Bonola |
| 6,282,633 B1 | 8/2001 | Killian et al. |
| 6,295,571 B1 | 9/2001 | Scardamalia et al. |
| 6,321,323 B1 | 11/2001 | Nugroho et al. |
| 6,385,757 B1 | 5/2002 | Gupta et al. |
| 6,415,379 B1 | 7/2002 | Keppel et al. |
| 6,477,683 B1 | 11/2002 | Killian et al. |
| 6,477,697 B1 | 11/2002 | Killian et al. |
| 6,496,847 B1 | 12/2002 | Bugnion et al. |
| 6,615,167 B1 | 9/2003 | Devins et al. |
| 6,658,578 B1 | 12/2003 | Laurenti et al. |
| 7,036,106 B1 | 4/2006 | Wang et al. |
| 2006/0149929 A1* | 7/2006 | Cervini .................. 712/217 |
| 2014/0129805 A1* | 5/2014 | Husby .................... 712/214 |

FOREIGN PATENT DOCUMENTS

| | | |
|---|---|---|
| GB | 2308470 | 6/1997 |
| WO | WO 97/13209 | 4/1997 |

\* cited by examiner

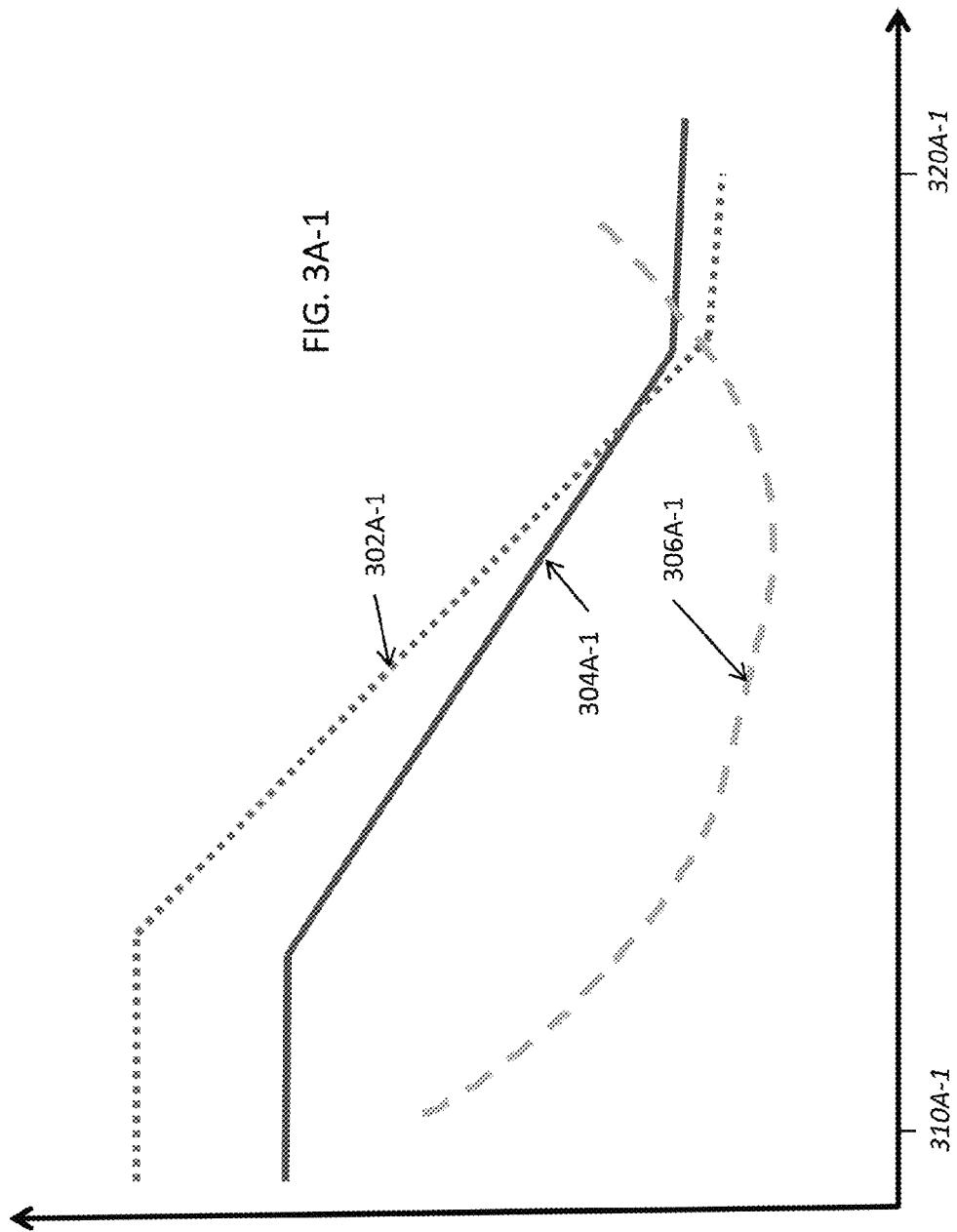

METHOD, SYSTEM, AND COMPUTER PROGRAM PRODUCT FOR IMPLEMENTING A MICROPROCESSOR WITH A CUSTOMIZABLE REGISTER FILE BYPASS NETWORK

CROSS-REFERENCE TO RELATED APPLICATIONS

This application is related to U.S. Pat. No. 7,036,106 filed on Feb. 17, 2000 and entitled "AUTOMATED PROCESSOR GENERATION SYSTEM FOR DESIGNING A CONFIGURABLE PROCESSOR AND METHOD FOR THE SAME", U.S. Pat. No. 6,477,697 filed on May 28, 1999 and entitled "ADDING COMPLEX INSTRUCTION EXTENSIONS DEFINED IN A STANDARDIZED LANGUAGE TO A MICROPROCESSOR DESIGN TO PRODUCE A CONFIGURABLE DEFINITION OF A TARGET INSTRUCTION SET, AND HDL DESCRIPTION OF CIRCUITRY NECESSARY TO IMPLEMENT THE INSTRUCTION SET, AND DEVELOPMENT AND VERIFICATION TOOLS FOR THE INSTRUCTION SET", and U.S. Pat. No. 6,477,683 filed on Feb. 5, 1999 and entitled "AUTOMATED PROCESSOR GENERATION SYSTEM FOR DESIGNING A CONFIGURABLE PROCESSOR AND METHOD FOR THE SAME". The entire contents of the three aforementioned U.S. patents are hereby expressly incorporated by reference in their entirety for all purposes.

COPYRIGHT NOTICE

A portion of the disclosure of this patent document includes material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The instruction set architecture (ISA) of a microprocessor usually defines registers that correspond to entries in a register file and are used to stage data between various memory modules and functional modules of the microprocessor. Modern microprocessors may include a register bypass network that provides additional data paths to, for example, forward results that have not been committed or to eliminate data hazards in the pipelines. Some conventional microprocessor designs use a full bypass network such that a piece of data generated in a specific cycle from a register file write port becomes available at one or more register file read ports in the next cycle and thus may result in a reduced number of read-after-write stalls between instructions that write to a register and a subsequent instruction that reads the same register. Although a full bypass network may reduce the number of clock cycles when executing the same program, a full bypass network may exhibit several disadvantages when compared to a partial bypass network. Therefore, there exists a need for a method, system, and computer program product for implementing a microprocessor with a selective register file bypass network.

SUMMARY

Disclosed are method(s), system(s), and article(s) of manufacture for implementing a microprocessor with a selective register file bypass network. Some embodiments are directed at a method for implementing a microprocessor with a selective register file bypass network. In some embodiments, the method may remove late bypasses from a register file bypass network of a microprocessor design, automatically add one or more late bypasses to the register file bypass network based at least in part upon analysis results of a plurality of instructions to be executed by the microprocessor, and generating an electronic design for at least the register file bypass network with the one or more late bypasses that are automatically added to the register file bypass network.

In some of these embodiments, the method that removes late bypasses from the register file bypass network may further automatically add one or more early bypasses to electronic design, automatically transmit information that includes the one or more early bypasses and indicates that the electronic design includes no late bypasses by using a register file specification with a compiler or a register file generation module, automatically add stall logic in response to the information indicating that the electronic design includes no late bypasses, and automatically generate or modifying the electronic design to include no bypasses by using at least the information with the register file generation module. A register file generation module may perform the register file generation functions separately from and independent of the compiler in some embodiments. In some other embodiments, the compiler may include the register file generation module as a sub-module in the compiler and perform the register file generation functions.

In some of these immediately preceding embodiments, the method that removes late bypasses from the register file bypass network may further add a first cycle or relaxing timing requirements for a removed late bypass route by converting the removed bypass route to at least a first instruction pipeline stage to an early bypass of a second instruction pipeline stage, wherein the first instruction pipeline stage precedes the second instruction pipeline stage. In addition or in the alternative, the method that removes late bypasses from the register file bypass network may further add a second cycle to one or more output operands of at least some of the plurality of instructions, wherein the one or more output operands correspond to one or more late bypasses of the late bypasses that have been removed.

In some embodiments where the method automatically adds one or more late bypasses to the register file bypass network, the method may further identify a first granularity level for specifying the one or more late bypasses, and share a first bypass specification for specifying a first bypass of the one or more late bypasses with at least another bypass, wherein the one or more late bypasses comprise multiple late bypasses that further include the at least another bypass. In some of these embodiments, the method may determine a plurality of requirements for a first port stage of a register file of the microprocessor based at least in part upon the first bypass specification, wherein the first port stage includes a write port stage, elaborate the first bypass specification at the first granularity level to include information of one or more slot indices, and map one or more operands to one or more ports of the register file.

In addition or in the alternative, for a first bypass in the first bypass specification, the method may connect a first operation operand, negation of an operation output kill, and an opcode decode to respective signal sources, determine whether or not a first operation argument is bypassed to a second operation argument in one bypass of the one or more late bypasses to generate determination results, and modify the electronic design based at least in part upon the determination results.

In some embodiments, the method may further share at least one bypass of the one or more late bypasses among a plurality of free-riders. Free-riders may include, for example, Instructions, instruction sequences, operands, port stages, or the data therein, wherein the data in these instructions, instruction sequences, operands, or port stages may be bypassed without having or requiring any bypass specifications. In some of these embodiments, the method that shares the at least one bypass may further identify a first set of instructions in a semantic from the plurality of instructions in a slot index that writes to output operands, and associate the first set of instructions with a control signal while reusing the output operands and same enable signals for the some instructions. In addition or in the alternative, the method that shares the at least one bypass may identify a second set of instructions that read from a first port stage, bypass the second set of instructions to a first operand in the first port stage by using a first bypass of the one or more late bypasses that are automatically added to the register file bypass network, and share the first bypass with one or more other operands in the first port stage by indicating information about the first bypass to the one or more other operands in the first port stage. The method that shares the at least one bypass may further optionally determine whether a first set of instructions in a semantic or a second set of instructions that read from a first port stage benefits from the at least one bypass to generate determination results, and determine whether or not the at least one bypass is software-visible based at least in part upon the determination results.

In some embodiments, the method may further optionally bypass a first port stage in the instruction pipeline of the microprocessor to a second port stage by using at least one bypass of the one or more late bypasses. In some of these embodiments, the method that optionally bypasses the first port stage to the second port stage may further identify a first port bypass in the one or more late bypasses from the first port stage to the second port stage, identify write port data and multiple signals for the first port stage, and transmit information or data concerning the first port bypass to a register file generation module.

In addition or in the alternative, the method that optionally bypasses the first port stage to the second port stage may further convert the first port bypass into an operand bypass that bypasses a first operand to a second operand, and transmit information concerning the operand bypass to one or more software tools for the one or more software tools to perform their respective functions. Optionally, the method in some of these embodiments may further determining whether a set of instructions benefits from the first port bypass to generate determination results, and determine whether or not the first port bypass is visible by the one or more software tools based at least in part upon the determination results.

Some embodiments are directed at a hardware module or system that may be invoked to perform any of the methods, processes, or sub-processes disclosed herein. The hardware system may include, for example, one or more compilers, register file generation module, free-rider module, and/or bypass removal and addition module, etc. that function in conjunction with various sub-systems of one or more computing systems to perform their respective functions in some embodiments. It shall be noted that in some embodiments, the functions of the complier and those of the register file generation module may be performed by a single module such as the compiler. For example, the compiler may also perform the register file generation function in these embodiments. Therefore, the term "register file generation module" may also refer to the compiler throughout this application, unless otherwise specifically distinguished. The hardware system may further include one or more forms of non-transitory machine-readable storage media or devices to temporarily or persistently store various types of data or information such as various constructs, bypass specifications, generated hardware designs, one or more generated software tools, one or more simulation, verification, or modeling tools, dynamically link libraries, etc.

At least one of these aforementioned modules works in conjunction with at least one processor executing one or more threads of execution and/or the non-transitory machine-readable storage media or devices of a computing system to perform various acts described in this application and thus enhances the functionality and capability of a computing system (e.g., a general purpose computing system) and enables a computing system to perform functions that would not otherwise be possible without various embodiments described herein. Some illustrative modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some illustrative forms of the non-transitory machine-readable storage media may also be found in the System Architecture Overview section below.

More details of various aspects of the methods, systems, or articles of manufacture for implementing a microprocessor with a selective register file bypass network are described below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIG. 3A-1 shows the illustrative relations between the cycle count and frequency versus the number of late bypasses in some embodiments.

DETAILED DESCRIPTION

Various embodiments of the invention are directed to methods, systems, and articles of manufacture for implementing a microprocessor with a selective register file bypass network. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of various embodiments described in this Application. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Figure 1:
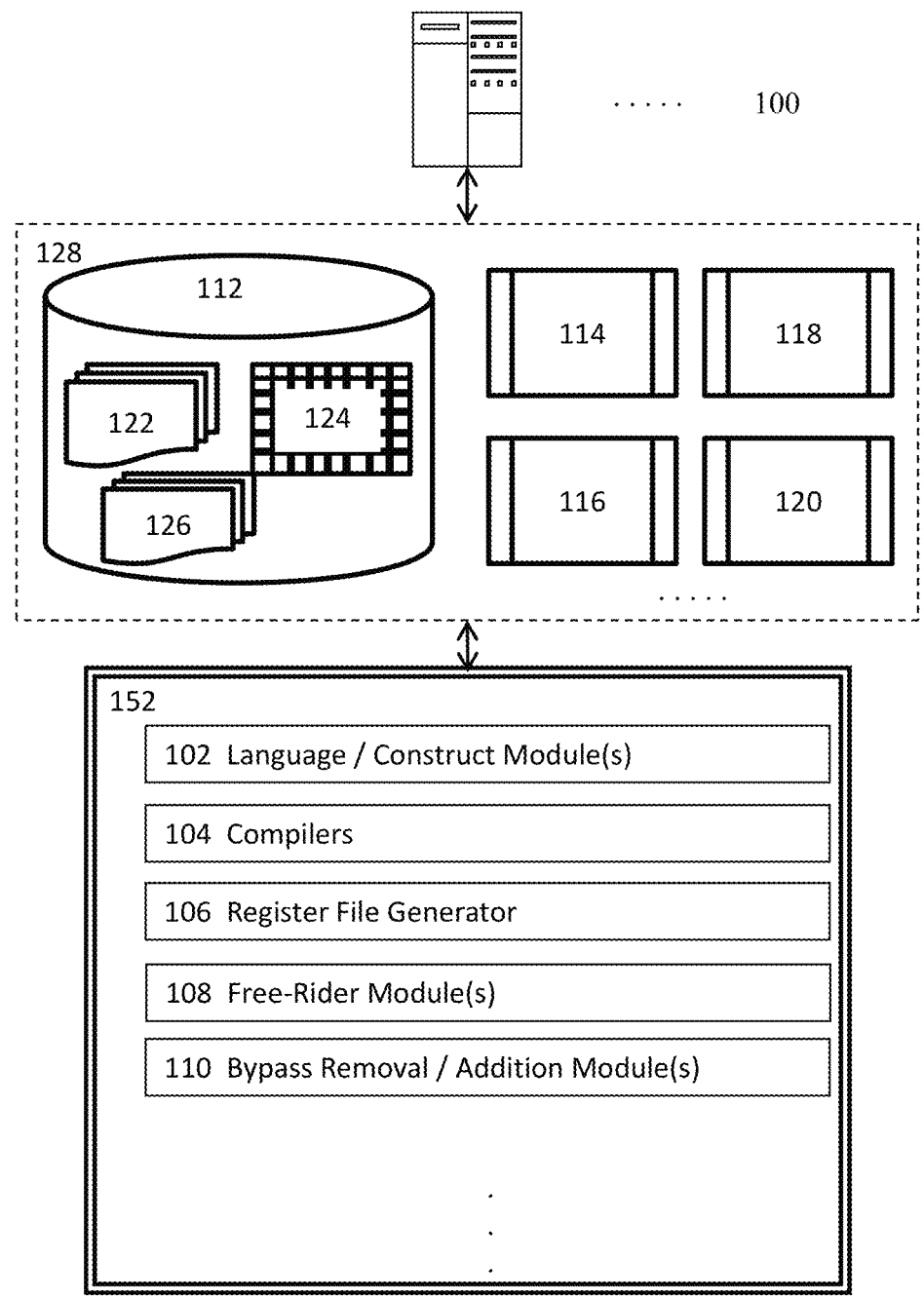
FIG. 1 illustrates a high level schematic flow diagram of a system for implementing a microprocessor with a selective register file bypass network in some embodiments.

Disclosed are method(s), system(s), and article(s) of manufacture for implementing a microprocessor with a selective register file bypass network in one or more embodiments. In one or more embodiments, FIG. 1 illustrates an illustrative high level schematic block diagrams for implementing a microprocessor with a selective register file bypass network and may comprise one or more computing systems 100, such as a general purpose computer described in the System Architecture Overview section to implement one or more special proposes.

In some embodiments, the one or more computing systems 100 may invoke various system resources such as the processor(s) or processor core(s), memory, disks, etc. The one or more computing systems 100 may also initiate or interact with other computing systems to access various resources 128 that may comprise a floorplanner, a global routing engine, and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), electronic circuit design specification database(s), various statistics, various data, rule decks, various design rules, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof 152 that may comprises one or more programming language and/or construct modules 102 including, for example, the register file construct, the instruction extension language construct, etc. to declare new register file, to implement the microprocessor design or a portion thereof, to analyze sharing and/or dependency among instructions, to generate, save, and restore sequences of a co-processor, to declare instructions as intrinsic functions, to generate the instruction set architecture (ISA) description, etc.

The various software, hardware modules or combinations thereof 152 may further include one or more compiler modules 104 including, for example, an instruction set extension compiler and a C/C++ compiler, etc. to declare some or all instructions as intrinsic functions, to declare the number of read and/or write ports, to create conventional programming language definitions (e.g., definitions in C, C++, etc. conventional programming languages) of intrinsics for new instructions (e.g., user-specified instructions) as functions. The one or more compiler modules 104 may further generate and/or analyze dependency among some instructions, to generate the save and restore sequences for a co-processor, and to derive or generate physical and/or schematic implementation of microprocessor designs either alone or in conjunction with one or more other modules.

In addition or in the alternative, the one or more compiler modules 104 may generate the instruction set architecture (ISA) description and the objects (e.g., PERL objects for obtaining the ISA and pipeline information) for user-specified instructions, to translate implementation semantics into HDL (hardware description language) of the register file, the interlock, bypass routes, core interfaces, exceptions, etc. for subsequent verification of the implementation semantics, etc.

In various embodiments, the terms "instruction set extension compiler" and "compiler" may be used interchangeably to refer to a compiler unless otherwise explicitly specified. An instruction set extension compiler may generate, for example, instruction decoding logic, logic for expanding instructions in user applications, logic for simulating instructions, Verilog HDL or Hardware Description Language for hardware designs, various scripts to, for example, optimize a processor design, etc. Another type of compiler (e.g., C/C++ compiler in 104 of FIG. 1) uses the information generated by an instruction set extension compiler and may also be referred to as a "C compiler" unless otherwise specifically specified.

The various software, hardware modules or combinations thereof 152 may further includes one or more register file generation modules 106 to generate the register file with the corresponding hardware design, software design, test bench design, electronic design automation tool scripts or code, etc. for the microprocessor design with the desired or required register file bypass network, one or more free-rider modules 108 to identify and share a bypass route among a plurality of operands and/or to identify and bypass from a first port to a second port, one or more bypass removal and addition modules 110 to remove some bypass routes and to selectively add back at least one of the removed bypass routes.

Figure 2A:
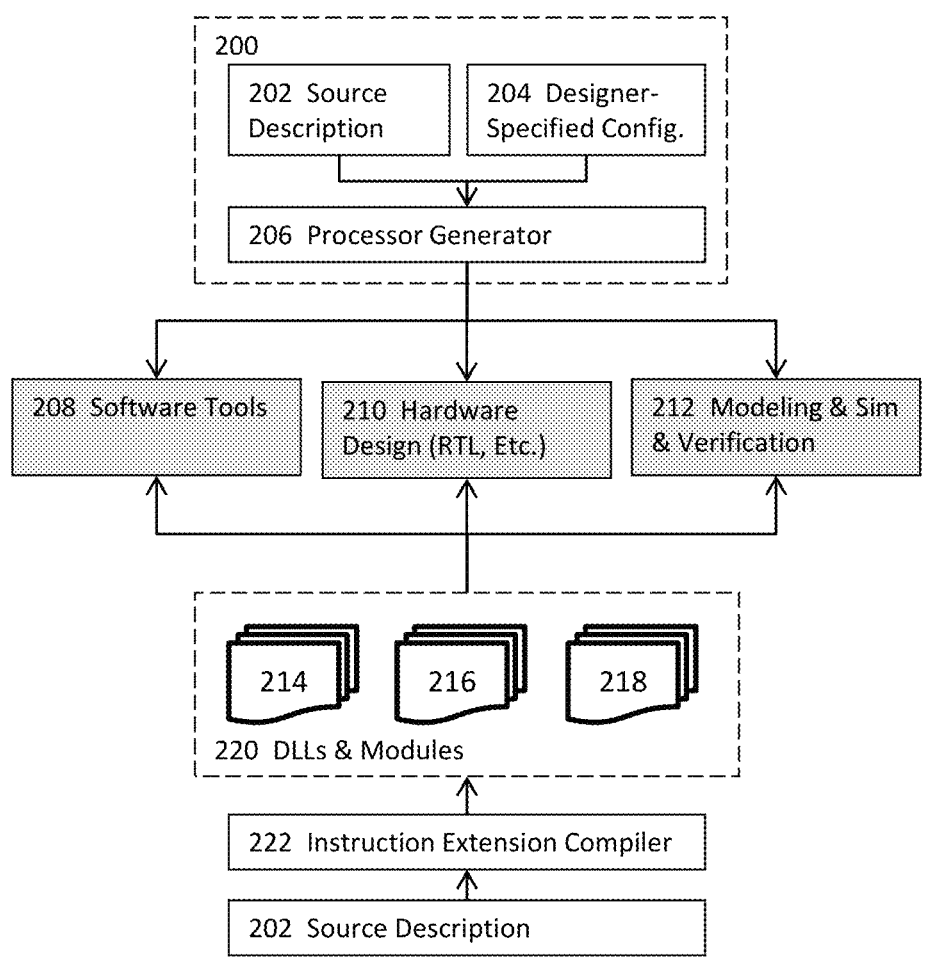
FIG. 2A illustrates a high level simplified schematic diagram for implementing a microprocessor with a selective register file bypass network in some embodiments.

FIG. 2A illustrates a high level simplified schematic diagram for implementing a microprocessor in some embodiments. In these embodiments illustrated in FIG. 2A, process flow for implementing a microprocessor with, for example, new, custom, or designer-specified instructions, new execution units, a designer-specified register file, bypass specification, etc. may start with receiving at 200 a source description file 202 and/or some designer-specified configurations 204 that a designer may specify for one or more target applications to be performed or executed by a system on a chip (SOC).

In some of these illustrated embodiments, the source description 202 includes a single source description that comprises designer-specified extensions or customizations of a microprocessor design and drives the generation of the hardware designs 210, the software tools 208, and the modeling and verification code or scripts as well as the simulation, modeling, or verification environments of various simulation, verification, or modeling tools 212. A system on a chip (SOC) or a part thereof may include, for example, a digital signal processor (DSP), a data plane processor (DPU), or a part of a DSP or a DPU. A dataplane processor is a microprocessor that may be implemented on a semiconductor substrate (e.g., a single crystal silicon wafer) and include a central processing unit (CPU), a processor core, or any part thereof as well as some custom logic (e.g., task specific, differentiating, or direct point-to-point interface(s), etc.) and/or one or more DSPs.

A compiler 222 may be used to generate the dynamic linking libraries (or dynamic-link libraries or DLL) and/or module 220 and process the source description 202 with before the source description file 202 is sent to the processor generation module 206 to generate the processor generation output with the new, custom, or designer-specified instructions, new execution units, etc., without requiring the processor generation output to be re-linked or re-compiled. The compiler 222 may support both a hardware description language (HDL) and a general high-level programming language (e.g., C or C++ programming language). For example, the compiler 222 may explore and verity the implementations of the microprocessor architecture or a part thereof before the source description file 202 is sent to the processor generation module 206 to generate the processor generation output which comprises one or more of the software tools 208, the hardware RTL (register transfer level) designs 210, and/or various models and verification modules 212.

For instance, the compiler 222 may generate one or more dynamic-link libraries 214 including, for example, software DLLs for one or more other compilers, assemblers, dissemblers, and/or profilers (e.g., a performance profiler or a code profiler) and may process the source description 202 in order for the processor generation module 206 to produce one or more software tools 208 with the source description 202. As another example, the compiler 222 may generate one or more dynamic-link libraries (DLLs) 216 including, for example, shared code or data from one or more DLLs 216 and/or the hardware RTL 210 (or other hardware design at one or more other abstraction levels) for the microprocessor design or a portion thereof (e.g., the intermediate or final bypass network of a microprocessor design).

The one or more DLLs 216 may include, for example, various source code (e.g., Verilog code) for the hardware design, synthesis scripts or code for use in hardware design or estimates, etc. As another example, the compiler 222 may invoke one or more dynamic-link libraries 216 including, for example, shared code or data from one or more DLLs 218 for modeling and verification 212 to model, simulate, verify, or otherwise analyze various hardware design or software tools 212 associated with the microprocessor design. The one or more DLLs 218 may include, for example, simulation or verification functions and environment for the implementations of some or all instructions, test vectors, test program, code, or scripts from the test vectors, formal verification scripts, etc.

In some embodiments where the instruction set extension compiler 222 includes a hybrid compiler supporting both a hardware description language (HDL) and a general high-level programming language (e.g., C or C++ programming language), the general description of such a compiler 222 is described in U.S. Pat. No. 7,036,106, the content of which is hereby incorporated by reference in its entirety for all purposes. More details about the flows of implementing a microprocessor design that includes a selective bypass network will be described below with reference to FIGS. 3-3E. In various embodiments, various modules are integrated together to automatically generate various components described in FIG. 2A. For example, various modules are integrated together for the compiler 222 to elaborate the source description to automatically generate the dynamic linking libraries and/or modules 220 which may be further used together with the designer-specified configuration inputs 204 to automatically generate the software tools 208, the hardware designs 210, and the modeling, simulation, and simulation modules 212, without human intervention.

Figure 2B:
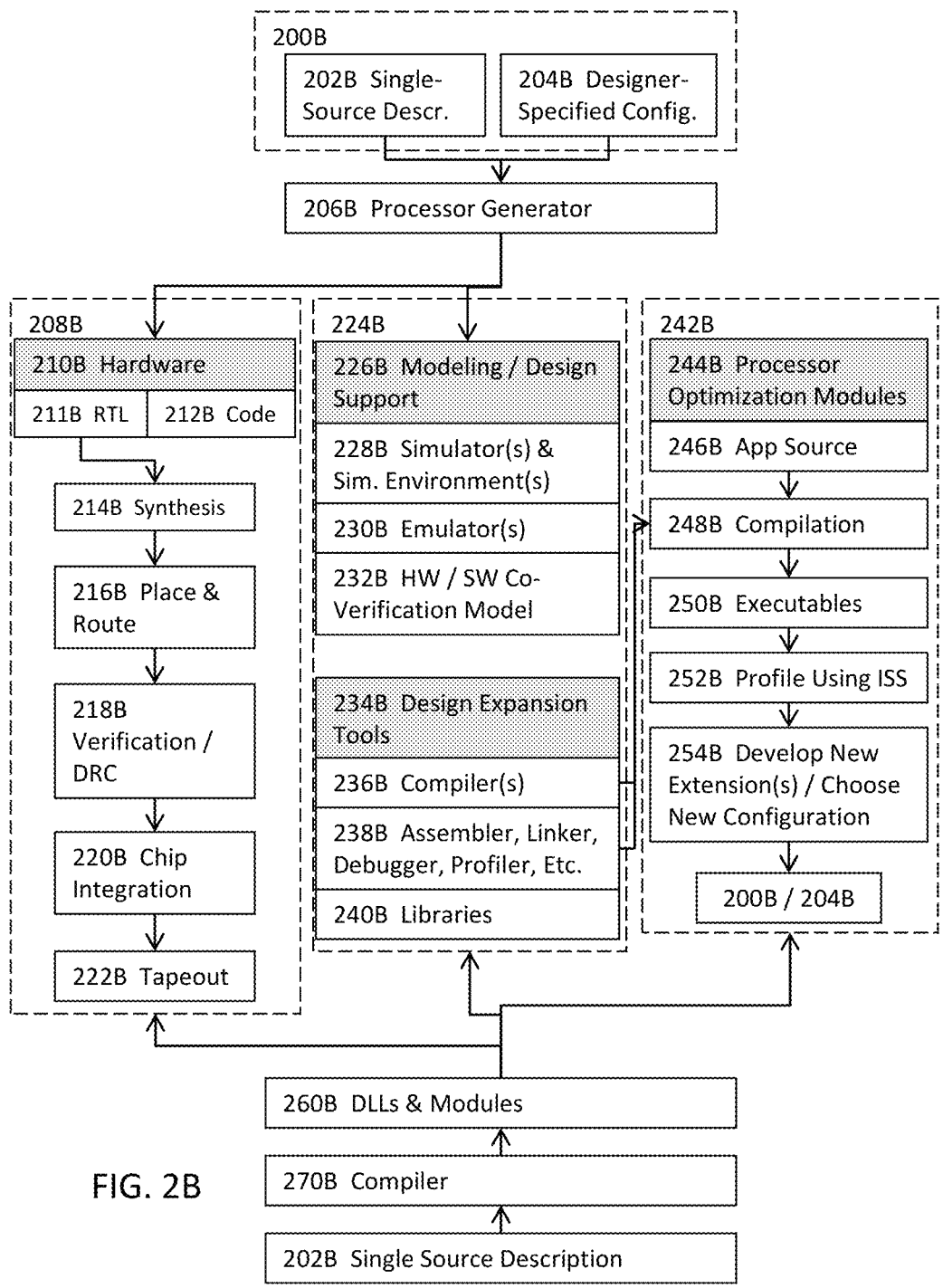
FIG. 2B illustrates a more detailed, simplified schematic diagram for implementing a microprocessor with a selective register file bypass network in some embodiments.

FIG. 2B illustrates a more detailed schematic flow diagram for implementing a microprocessor with a selective register file bypass network in some embodiments. In some of these embodiments illustrated in FIG. 2B, a source description 202B may be used in conjunction with one or more designer-specified or custom configurations or configuration inputs as input 200B to a processor generation module 206B to generate the processor generator output that further includes 208B, 224B, and 242B. In some embodiments, the source description may include a single source description that comprises designer-specified extensions or customizations of a microprocessor design and drives the processor generator output that further includes 208B, 224B, and 242B.

The source description 202B may be processed by compiler 270B (e.g., compiler 222 in FIG. 2A) generating a plurality of DLLs or modules 260B before the source description 202B is forwarded to the processor generation module 206B for creating various process generator output. The processor generator output may include, for example, the hardware design portion 210B including the designs of a microprocessor or a portion thereof, RTL 211B (e.g., the RTL design of the microprocessor or a portion thereof) and/or the code, program, or scripts (collectively "code") 212B for implementing the hardware designs at various abstraction levels. In some embodiments, the RTL design may be further processed via various electronic design automation (EDA) tools to determine the designs of the microprocessor or a portion thereof at one or more other abstraction levels.

In some other embodiments, the code 212B may be used on various EDA tools to implement the designs of the microprocessor. For example, a synthesis tool may be invoked to perform synthesis at 214B for the RTL design; a place and route tool may be invoked to perform placement and routing 216B for the synthesized design to generate a layout; a verification engine or DRC (design rule checking) tool may perform various verifications or design rule checks 218B on the layout; chip integration 220B may be further performed for the design; and the signed-off design may be forwarded to tape-out 222B for manufacturing.

The processor generator output may also include output for modeling and expansion suit 224B. The modeling and expansion suit 224B may include the system design and design methodology support 226B which automatically generates a software development tool chain. For example, the processor generator 206B may process the source description 202B with the designer-specified configuration inputs 204B to automatically generate the code that drives one or more simulators and/or sets up the simulation environments 228B; the processor generator 206B may also automatically generate the code that drives one or more emulators and/or sets up the emulation environments 230B; or the processor generator 206B may further automatically generate the code that drives one or more software-hardware co-simulations and/or sets up the environments therefor 232B in some embodiments.

The software development tool chain automatically generated by the system design and design methodology support 226B may further include, for example, an integrated development environment (IDE) including a base environment and an extensible plugin system for customizing the base environment. The integrated development environment may be used to develop applications such as those compilers, simulators, emulators, assemblers, profilers, linkers, debuggers, etc. in 224B and 240B.

The modeling and expansion suit 224B may further include one or more design expansion tools 234B that may include, for example, one or more compilers 236B (e.g., a vectorizing C/C++ compiler for parallelization, etc.), other program code 238B such as assembler, linker, debugger, debug probes, performance or code profiler, etc., and the supporting libraries 240B. The one or more compilers 236B may be used to generate, for example, microprocessor configurations from a standard programming language code such as C or C++ code. The design expansion tools 234B may also include instruction set simulator (e.g., a pipeline-modeled, cycle-accurate instruction set simulator), various application programming interfaces (APIs) for various simulators, emulators, compilers, etc.

The schematic flow diagram illustrated in FIG. 2B may further include an optimization loop 242B to optimize various aspects of the microprocessor design while accounting for the source description 202B and the designer-specified configuration input 204B. For example, the optimization loop may include various processor optimization modules and corresponding environment 244B to compile (248B) and generate the executables 250B for the corresponding source code 246B of various algorithms, functions, instruction extensions, functional units, execution units, etc. These executables 250B may be executed and profiled (252B) with one or more code profilers and/or one or more performance profilers on a microprocessor simulation model (e.g., an instruction set simulator or ISS) that simulates the behavior of the microprocessor of design interest based on the instructions read and the internal variables or states representing the microprocessor's registers.

Based on the profiling or simulation results of the microprocessor simulation model with the executables 250B of the source code 246B, one or more new extensions and/or one or more new configurations may be developed or determined at 254B to meet the targeted or desired tasks, applications, instructions, and/or performance objectives for the microprocessor design of interest. These one or more new extensions and/or one or more new configurations may be forwarded to the source description 202B and/or the designer-specified configuration input 204B of the input 200B for the processor generation module 206B to generate the processor generator output 208B, 224B, and/or 242B. In some embodiments, the optimization loop 242B may perform, for example, algorithm performance optimization, instruction set optimization, power optimization, microprocessor area and/or speed optimization, etc. for the microprocessor design of interest.

In these embodiments illustrated in FIG. 2B, the processor generator 206B may receive the source description 202B and the designer-specified configuration input 204B to automatically generate various program code, models, libraries, environments, etc. that may be further used to custom tailor the microprocessor design to an exact fit for the targeted or desired tasks, applications, instructions, and/or performance objectives. In various embodiments, various modules are integrated together to automatically generate various components described in FIG. 2B. For example, various modules are integrated together for the compiler 270B to elaborate the source description 202B to automatically generate the dynamic linking libraries and/or modules 260B which may be further used together with the designer-specified configuration inputs 204B to automatically invoke the processor generator 206B to generate various modules, code, information, or data in the processor generator module 208B, the modeling and expansion suit 224B, and the optimization loop 242B, without human intervention.

Figure 3:
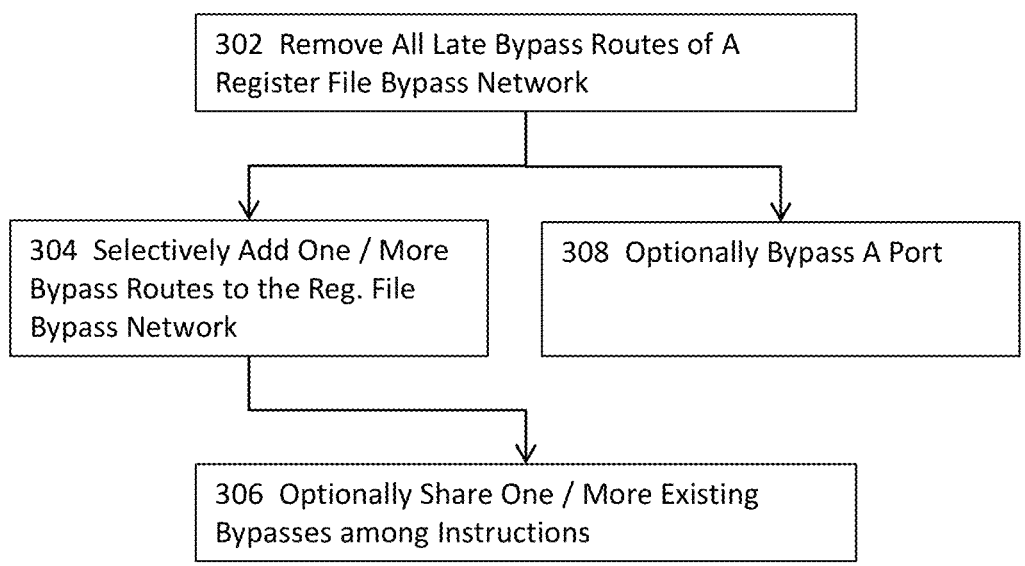
FIG. 3 illustrates a high level flow diagram of a method or system for implementing a microprocessor with a selective register file bypass network in some embodiments.

FIG. 3 illustrates a high level flow diagram for a method or system for implementing a microprocessor with a selective register file bypass network in some embodiments. In these embodiments illustrated in FIG. 3, the method or system may first remove all late bypasses or bypass routes (collectively "bypasses") in a bypass network at 302. A bypass comprises a route that is devised to transmit written data to a read port before the written data is committed such that a simultaneous read and write to the same register entry may be commanded. A late bypass (or a direct bypass) may include a bypass that forwards the data calculated in a semantic block directly to the read port of the consumer instruction in some embodiments. The read-after-write delay is one cycle. This late bypass route is usually late in a clock period and may sometimes limit the frequency of the processor. An early bypass (or an indirect bypass) may include a bypass that forwards data generated in a semantic block in previous cycles to the read port of the consumer instruction. The read-after-write delay is more than one cycle. This early bypass route starts from the output of a flop and is usually early in a clock period.

An early bypass includes the bypass route that is devised to forward data to an execution stage of the instruction pipeline of the microprocessor; and a late bypass includes the bypass route that is devised to forward data to another execution stage that is located after the current execution stage in the execution pipeline. Generally, both the cycle count and frequency increase as the late bypasses are removed as illustrated in FIG. 3A.

Figure 3A:
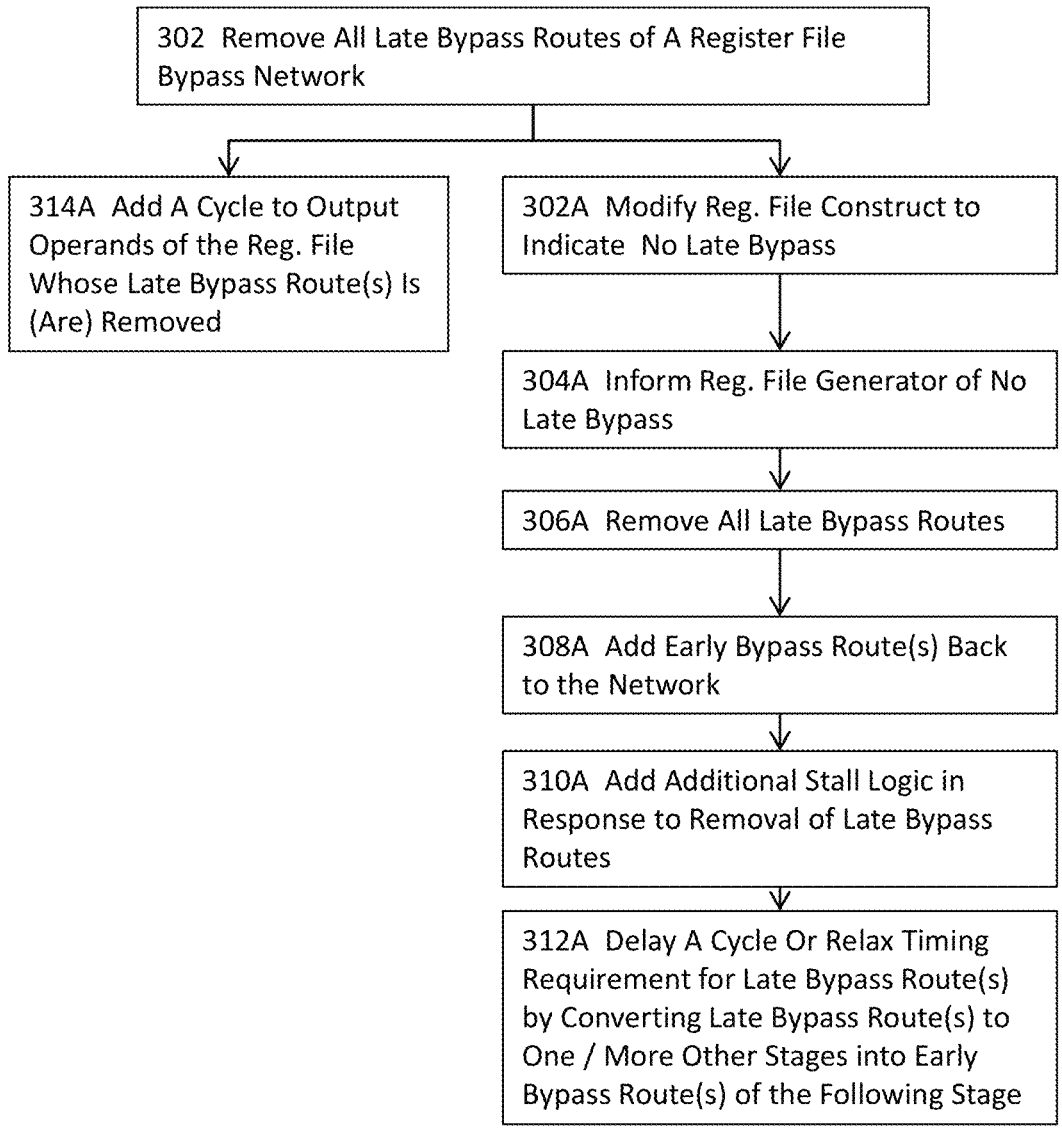
FIG. 3A illustrates a more detailed flow diagram for a processor module illustrated in FIG. 3 for implementing a microprocessor with a selective register file bypass network in some embodiments.

FIG. 3A-1 shows the illustrative relations between the cycle count and frequency versus the number of late bypasses in some embodiments. In these embodiments illustrated in FIG. 3A-1, the horizontal axis indicates the number of late bypasses in the register file bypass network, where 310A-1 indicates no late bypasses in the bypass network, and 320A-1 indicates full late bypasses in the register file bypass network. The line plot 302A-1 indicates the cycle count which generally increases as the late bypasses are removed. Curve 304A-1 indicates the frequency that also generally increases as the late bypasses are removed from the register file bypass network. Curve 306A-1 represents the optimizations that may be needed or desired with different numbers of late bypasses in the bypass network.

In some embodiments, the method or system may add an optional keyword in the register file construct to inform the compiler (e.g., compiler 104) to remove all late bypasses for the register file bypass network. In response, the compiler may pass an optional argument to the register file generator (e.g., the register file generator 106) to inform that the register file bypass network does not have late bypasses. The register file generator, which may be a part of the compiler (e.g., reference character 222 of FIG. 2A or 236B of FIG. 2B) may then remove all late bypasses in the register file in some embodiments or generate the register file without having any late bypasses in some other embodiments at 302.

In some of these embodiments illustrated in FIG. 3, the method or system may further determine whether early bypasses exist in all non-first-stage read pipeline. If it is determined that at least some of the early bypasses do not exist in the non-first-stage read pipeline, the method or system may further ensure that early bypasses are added back to all non-first-stage read pipeline in some of these embodiments. In these embodiments, the early bypasses for the first-stage of the read pipeline already exist and are not removed by the actions at 302, and thus no changes are needed. In addition or in the alternative, the stall logic may become more complex due to the removal of late bypasses from the register file bypass network in some embodiments. The method or system may add one or more additional stall conditions in response to the removal of late bypasses at 302.

One of the advantages of these embodiments illustrated in FIG. 3 is that because the late bypass to the all stages of a read port are removed, timing may be improved and routing congestion may be alleviated. The first stage of a read port may often be timing critical, and late bypasses to a lot of stages may cause routing congestion due to the locations of these routes and also the total number of these late bypasses. This advantage is especially apparent for higher frequency designs or for register file ports, each containing one read port stage. In some embodiments, the method or system may convert late bypasses to other stages into early bypasses of the following stage in the instruction pipeline. In these embodiments, these bypass routes still exist in the design but are delayed a cycle with relaxed timing requirements.

At 304, the method or system may selectively add one or more bypasses to the register file bypass network of a microprocessor design. In some of these embodiments illustrated in FIG. 3, the method or system selectively adds the minimum number of bypasses to the register file bypass network. In addition or in the alternative, the method or system may automatically add one or more bypasses to the register file bypass network based at least in part upon analysis results of a plurality of instructions to be executed by the microprocessor.

For example, the method or system may analyze the plurality of instructions and selectively identify and add a bypass route that bypasses a first operation to a second operation in some embodiments. The method or system may analyze the plurality of instructions and selectively identify and add a bypass route that bypasses a first operand to a second operand in some other embodiments. Yet in some other embodiments, the method or system may analyze the plurality of instructions and selectively identify and add a bypass route that bypasses a first port stage to a second port stage. A bypass may be specified in a bypass specification (e.g., source description 202 of FIG. 2A or 202B of FIG. 2B) in a format understood by the compiler (e.g., the instruction set extension compiler 222 of FIG. 2A or the compiler 270B of FIG. 2B) so that the compiler may elaborate the bypass specification and map the operands to the corresponding ports and to generate the hardware design for the bypass specification.

In some embodiments, the method or system may use an instruction group for bypass specification. One of the advantages of using an instruction group is to avoid specifying many bypass constructs on the same bypass routes. An instruction group may be declared by designers or users in some embodiments, and one or more default instruction groups may also be automatically defined or provided by the method or system. An instruction group may be declared or created by using the following illustrative syntax:

instruction_group-def::=instruction_group name {instr-name [, instr-name]*}
name::=a unique name representing the instruction group
instr-name:=an instruction name In a bypass specification, the method or system may use the "name" of the instruction group in place of the identification of an "opcode" or "operation" as provided in other illustrative examples described in this application. For example, the instruction group described immediately above may reference the "name" of the corresponding instruction group, instead of the "opcode" or "operation", for a plurality of instructions sharing a bypass as long as the operand or operation argument in the plurality of instructions have the same use stage and def stage, and the plurality of instructions associated with the instruction group have the same operand or operation argument and are declared in the same slot index.

It shall be noted that although the specification contains some illustrative code that is expressed in a specific programming language, various embodiments described in this application may also perform their respective functions to achieve their respective purposes when the illustrative code is expressed in one or more other programming languages. Therefore, the representation of the illustrative code in a particular programming language having specific syntactical requirements shall not be considered as limiting the scope of the claims or the scope of various embodiments described in this Disclosure.

In addition or in the alternative, the method or system may also revise or create a pertinent section of code for an electronic design automation tool to associate a register file with a group that includes one destination of a bypass. The method or system may further associate the same group with multiple instructions if the method or system determines that these multiple instructions have the same bypass destination in some of these embodiments, regardless of whether or not these multiple instructions have the same bypass source or different bypass sources. In one embodiment, the method or system may identify the total number of read port stages as the maximum number of groups.

An opcode or operation code may include the portion of a machine language instruction that specifies the operation to be performed in some embodiments. In these embodiments, the specifications and format of opcodes may be specified in the ISA of the microprocessor of interest. The method or system may also define the complex types for opcodes from multiple basic types to support selective bypasses.

In some embodiments where the compiler (e.g., the C/C++ compiler in 104 of FIG. 1) may not have the slotting information (e.g., instruction slotting information used for deciding which of the next instructions may be issued or for steering an instruction to a proper functional or execution unit) for the operations when scheduling the operations, the appropriate granularity for specifying a bypass may include the tuple (operation, argument) (operation, argument) to ensure accurate read-after-write delay information even though the appropriate granularity to specify the bypass on the hardware side may include the tuple pair (operation, argument, slot-index) (operation, argument, slot-index). It shall be noted that in these embodiments, one bypass specification may correspond to multiple bypasses. For example, if a bypass is specified as "regbypass {oper1, arg1} {oper2, arg2}" in the complier, where "oper1" is referenced in two slot indices (0, 1), and "oper2" is referenced in two slot indices (1, 2). The aforementioned bypass specification indicates four bypasses: "from slot index 0 to slot index 1", "from slot index 0 to slot index 2", "from slot index 1 to slot index 1", and "from slot index 1 to slot index 2".

Further, the following simplified, illustrative construct ("regbypass" construct) may be used for a bypass specification:

regbypass <regname>{operation1, arg1} {operation2, arg2} regbypass <regname>{opcode1, operand1} {opcode2, operand2}

In the above illustrative, simplified construct, "regbypass" denotes a keyword or identification for a bypass specification and is followed by two tuples. The first tuple "{opeartiton1, arg1}" or "{opcode1, operand1}" specifies the source of the bypass—"arg1" of "operation1" or "operand1" of the instruction "opcode1". The second tuple "{opeartiton2, arg2}" or "{opcode2, operand2}" specifies the destination of the bypass—"arg2" of "operation2" or "operand2" of the instruction "opcode2".

Moreover, the regbypass construct may be defined with the following illustrative syntax:

regbypass-def::=sytax1|syntax2|syntax 3 syntax1::={instr-name, operand-name} {instr-name, operand-name} syntax2::={operation-name, argument-name} {operation-name, argument-name} syntax3::={write-port-name, write-port-stage} {read-port-name, read-port-stage} instr-name::=a previously defined instruction name operand-name::=a previously defined operand used in the instruction operation-name::=a previously defined operation name argument-name::=an argument used in the operation write-port-name::=an explicitly defined write port write-port-stage::=an integer indicating the stage of the write port read-port-name::=an explicitly defined read port read-port-stage::=an integer indicating the stage of the read port In some of these embodiments where the compiler (e.g., the C/C++ compiler in 104 of FIG. 1) may not have the slotting information (e.g., instruction slotting information used for deciding which of the next instructions may be issued or for steering an instruction to a proper functional or execution unit) for the operations when scheduling the operations or where the compiler may require that the bypasses be slot index independent, the libraries for the instruction set architecture (ISA) (hereinafter ISA libraries) may need to be modified so that the compiler may be informed of the late bypasses. The ISA libraries may be written out by the instruction set extension compiler (e.g., the compiler 222 of FIG. 2A or compiler 270B of FIG. 2B) and may be used to retrieve instruction information including, for example, encodings, operands, etc. in some embodiments.

In some of these embodiments, the compiler (e.g., an instruction set extension compiler in 104) may also write out the opcode array for some or all instructions when the compiler writes out the ISA libraries. The ISA libraries written out by this compiler may be merged with existing ISA libraries in some embodiments. After the merger of ISA libraries, the method or system reads and processes only the latest or last written out ISA library components and ignores all previous versions of the corresponding ISA library components.

In some embodiments, the ISA libraries may be modified include one or more functions in the ISA libraries interface to indicate whether the register file construct includes the "no_bypass" attribute. In addition or in the alternative, the ISA libraries may be modified to include one or more function in the ISA libraries interface to indicate whether the delay between two instruction sequences from the source operand to the destination operand needs to be reduced by one cycle. When the compiler (e.g., the instruction set extension compiler 222 of FIG. 2A or compiler 270B of FIG. 2B) receives the construct illustrated above, the compiler may still convert the above construct into a more detailed construct including the slot indices. For example, the compiler may convert the above simplified, illustrative example into the following more detailed construct:

regbypass <regname>{operation1, arg1, index} {operation2, arg2, index} regbypass <regname>{opcode1, operand1, index} {opcode2, operand2, index}

The method or system may further ensure that the hardware description module (e.g., a Verilog module) of the compiler (e.g., compiler 222 of FIG. 2A or 270B of FIG. 2B) includes proper arguments for each write port stage and read port stage of a register file. For example, the method or system may include the following arguments for each bypass whose source comes from a write port stage: wr<x>_data_C<y>, wr<x>_def<y>_C0", "wr<x>_wen_C<y>", "wr<x>_<bypass_id>_data_C<y>", "wr<x>_<bypass_id>_def<y>_C0", and "wr<x>_<bypass_id>_wen_C<y>". In these arguments, <x> indicates a write port; <y> indicates a write stage in the write port; and wr<x>_data_C<y> indicates the data written to the register file in stage <y> of write port <x>. In addition, wr<x>_def<y>_C0 denotes a one-bit signal defined in the decode stage to indicate whether the instruction in the decode stage writes to the stage <y> of the write port <x>; and wr<x>_wen_C<y> indicates whether the write to stage <y> of write port <x> actually happens. Similarly, wr<x>_<bypass_id>_data_C<y>, wr<x>_<bypass_id>_def<y>_C0, and wr<x>_<bypass_id>_wen_C<y> denote the data signal, def signal, and enable signal for the bypass route <bypass_id>.

The compiler may transmit the following information to the register file generator for the illustrative construct provided above:

```
BYPASS=>[
    {NAME=>"%s",
    WIDTH=>%d,
    FROM=>"%s",
    FROM_STAGE=>%d,
    TO=>"%s",
    TO_STAGE=>%d,
    },
    {NAME=>"%s",
    WIDTH=>%d,
    FROM=>"%s",
    FROM_STAGE=>%d,
    TO=>"%s",
    TO_STAGE=>%d,
    },
],
```

In the above illustrative code passed from the compiler to the register file generator, the entry "NAME=>"%s"," indicates a unique identifier used in the hardware description module interface; the entry "WIDTH=>%d" indicates the width of the bypass and may be used for register file views; the entry "FROM=>"%s"" indicates the write port name of the source; the entry "FROM_STAGE=>%d" indicates the write port stage of the source of the bypass; the entry "TO=>'%s'" indicates the read port name of the destination of the bypass; the entry "TO_STAGE=>%d" indicates the read port stage of the destination of the bypass.

In the aforementioned example, the compiler (e.g., the instruction set extension compiler 222 of FIG. 2A or the compiler 270B of FIG. 2B) may connect various output operands, negation of the output operation kill, or opcode decode to corresponding arguments so that the compiler may elaborate the bypass specification and map the operands to the corresponding ports and to generate the hardware design for the bypass specification. For example, the compiler may connect the operation output operand to wr<x>_<id>_data_C<y>, connect the negation of the operation output kill to wr<x>_<id>_wen_C<y>, and connect the opcode decode to wr<x>_<id>_def<y>_C0. In the aforementioned example illustrated above, <x> denotes the register file port name; <id> denotes the bypass identification number (e.g., a group number); and <y> denotes the register file port stage number.

Once the compiler receives and elaborates the bypass specification, the compiler sends the compiled information or data to the register file generator that in turn generates, among other things, dedicated hardware design components for the bypass specification in these embodiments. For example, the register file generator creates the selective late bypasses by replacing wr<x>_data_C<y>, wr<x>_wen<C<y>, and wr<x>_def<y>_C0 from the full late bypass with the specified write signals—wr<x>_<id>_data_C<y>, wr<x>_<id>_wen<C<y>, and wr<x>_<id>_def<y>_C0, where there may be multiple <id> for one write port stage.

In these embodiments, the register file generator creates the one or more specified bypasses in the register file bypass network, rather than creating a full bypass network. In some of these embodiments, the compiler groups multiple operations that share one bypass from one write port to one read port by passing one or more former operation arguments to the one or more corresponding latter operation arguments. In addition or in the alternative, the source-destination delay of the operations in an operation pair that is bypassed may be reduced by one cycle from the previous calculation if there is no late bypass. In some of the immediately preceding embodiments, the compiler groups all operations that share one bypass from one write port to one read port.

In some of these embodiments, the compiler may not attempt to reduce the hardware design components or leverage the free-riders such that the implementation and automatic generation of the hardware designs for the bypass network is straightforward, although these embodiments may achieve such intended purposes at a slight expense of having additional software or hardware elements. In these embodiments, the method or system may provide one or more options including leveraging the free-riders to the designer to better balance between the ease of automatic generation of various hardware designs and software tools and the expenses of having additional software code or hardware designs.

In some embodiments where multiple output operands in a write port stage are bypassed to the same read port stage, the compiler (e.g., compiler 222 of FIG. 2A or compiler 270B of FIG. 2B) multiplexes the data such that at most one bypass is created for each write port stage and read port stage pair. At 306, the method or system may optionally share one or more existing bypasses among a plurality of instructions. The plurality of instructions may include those sharing a semantic output in some embodiments. In these embodiments, the bypass for one instruction on the output may also be used to bypass one or more other instructions sharing the semantic output without additional hardware or cost. In addition or in the alternative, data in some instructions or instruction sequences may be bypassed without having or requiring any bypass specifications, and such instructions, instruction sequences, operands, port stages, or the data therein are generally referred to as free-riders in this application. A semantic describes the hardware that implements an operation, while an operation block describes the behavior of the operation. A semantic may be used to implement more than one operations in some embodiments.

In addition or in the alternative, the bypass specified to one operand in a port stage may be shared with one or more other operands in the port stage. In some of these embodiments, a user specifies the bypass, and the bypass specified to one operand in a port stage may be shared with all the other operands in the port stage, without incurring additional hardware or cost. One of the advantages of supporting free-riders is the reduction in the need for explicit bypass specifications at least for some instructions, instruction sequences, or operands. In some of these embodiments, explicit bypass specification is required only for the bypasses required by software applications. Additionally or alternatively, some instructions rarely appear in software applications and thus may not be justified to have their dedicated bypass specifications. If a bypass has already been specified for another instruction, these instructions may share the already specified bypass at no additional hardware or cost if it is desirable to do so. Furthermore, providing the option to share one or more already specified bypasses for these instructions alleviates and turn the hard bypass constraints into soft bypass constraints, which impose relatively lower impact on frequency, such that these bypasses for these instructions may be safely removed when designers place the instructions to one or more new slots (and thus impose additional hardware or cost for the corresponding bypasses).

In terms of hardware designs, one of the advantages of supporting free-riders is that some or all instructions sharing the same output operand in a semantic may share a bypass. In some embodiments where an operand is defined only in a semantic, the control signal includes the def signal of the operand and thus requires no new signals. In these embodiments where multiple operands in one write port stage share the same bypass routes, the control signal may be obtained by performing the logical disjunction ("or") of the operand def signals, without the need for omitting one or two instructions to achieve the same purposes. A def signal or def statement instructs the compiler (e.g., the compiler 222 in FIG. 2A or compiler 270B in FIG. 2B) that the output of an instruction must be defined by the end of a pipeline stage in some embodiments. In addition or in the alternative, the hardware design is more efficient and simpler to bypass multiple or even all operands in a port stage if a bypass already exists to the read port stage due to one operand because the compiler (e.g., compiler 222 of FIG. 2A or 270B of FIG. 2B) needs only to generate the rd<x>_use<y>_C0 signal, which is required regardless of whether or not a bypass exists, and pipe down the signal to the following instruction pipeline stages. Therefore, additional hardware and cost in terms of area on the die may be avoided.

To support free-riders, the method or system may use the compiler (e.g., the compiler 222 in FIG. 2A or the compiler 270B in FIG. 2B) to determine the free-riders and generate the control logic accordingly in some embodiments. In some of these embodiments where a plurality of instructions share a semantic output, the method or system may simply identify the data value for the output operand and the enable signal, both of which already exist, and include the plurality of instructions in the control signal (e.g., the control signal wr<n>_<id>_def<y>_C0). In addition or in the alternative, the compiler may determine the free-riders by identifying the instructions in the semantic in a slot index that writes to the output operands.

In some of these embodiments of bypassing to one operand in a port stage, the compiler may use a signal (e.g., the rd<x>_use<y>_C0 signal) to indicate that the bypass is to all operands in the port stage. In addition or in the alternative, the compiler may determine the free-riders by identifying some or all instructions that read from the port stage. In some of the embodiments illustrated in FIG. 3, the compiler may further determine whether or not a free-rider determined by the compiler benefit from the bypass in all slot indices. If the determination is affirmation, the method or system may make the bypass visible to software applications. Otherwise, the bypass will be rendered a software-invisible bypass.

At 308, the method or system may further optionally bypass an entire write port stage to a read port stage in some embodiments. In these embodiments, the method or system needs not generate and pass dedicated data, enable signals, and def signals to the register file generation module. Rather, the method or system may use the data, enable signals, and the def signals for the write port stage. In addition, the method or system needs not generate the def pipeline stage and may use the def pipeline stage for the write port. The need for a separate multiplexer for the data, enable signals, and def signals may also be obviated when an entire port is bypassed. In some embodiments where a port is bypassed, the method or system may use the output of a four-to-one multiplexer, instead of creating a new three-to-one multiplexer that may increase the load of input signals and further delay the four-to-one multiplexer.

The method or system may use the following illustrative construct to specify the bypass from port to port: regbypass <regname>{<write port name>, <write port stage>} {<read port name>, <read port stage>}. In some embodiments where both the port bypass and operand bypass co-exist, the port bypass takes precedence, and the method or system may ignore the operand bypass. In some other embodiments, the method or system may determine whether all operands in a port stage are bypassed to another port stage. If the determination is affirmative, the compiler (e.g., the compiler 222 of FIG. 2A or compiler 270B of FIG. 2B) may create a port bypass for the port stage and pass the port bypass to the register file generator to generate the hardware design.

In these embodiments where the method or system determines to bypass a write port stage to a read port stage, the method or system may use the compiler to pass the original write port data, the enable signals, and the def signals in the bypass to the register file generation module, without passing the bypass data (e.g., we<x>_data_C<y>), the enable signals (e.g., wr<x>_wen_C<y>), and the def signals (e.g., wr<x>_def<y>_C0) separately to the register file generation module. In some of these embodiments, the compiler may pass the following information or data to the register file generator:

```
BYPASS=>[
    {NAME=>"%s",
    WIDTH=>%d,
    FROM=>"%s",
    FROM_STAGE=>%d,
    TO=>"%s",
    TO_STAGE=>%d,
    PORT_BYPASS=>1,
    },
]
```

In the above example, "WIDTH=>%d" denotes the width of the bypass and may be needed for register file views; "FROM=>'%s'" denotes the write port name of the source; "FROM_STAGE=>%d" denotes the write port stage of the source; "TO=>'%s'" denotes the read port name of the destination; and "TO_STAGE=>%d" denotes the read port stage of the destination. In those embodiments where the write port stage is bypassed, the "NAME=>'%s'" indicating the identification of the write port stage is ignored.

FIG. 3A illustrates a more detailed flow diagram for a processor module illustrated in FIG. 3 for implementing a microprocessor with a selective register file bypass network in some embodiments. More specifically, FIG. 3A illustrates more details for the process or module 302 for removing all late bypasses in a bypass network. At 302A, the process or module 302 may modify or create a register file construct to indicate that the register file does not include late bypasses. At 304A, the process or module 302 may further inform the register file generator that the register file includes no late bypasses.

The process or module 304A may pass an argument "no_late_bypass" to the register file generator to inform the generator that the register file does not have late bypasses in some embodiments. At 306A, the register file generator removes all late bypasses from the register file bypass network in some embodiments or generates the register file bypass network without late bypasses in some other embodiments. The register file generator may further add one or more early bypasses to the register file network at 308A. In some of these embodiments illustrated in FIG. 3A, the process or module 302 may further determine whether early bypasses exist in all non-first-stage read pipeline. If it is determined that at least some of the early bypasses do not exist in the non-first-stage read pipeline, the method or system may further ensure that early bypasses are added back to all non-first-stage read pipeline in some of these embodiments.

In these embodiments, the early bypasses for the first-stage of the read pipeline already exist and are not removed by the actions, and thus no changes are needed. Additional stall logic may be added in response to the removal of the late bypasses at 310A. The stall logic may become more complex due to the removal of late bypasses from the register file bypass network in some embodiments. The method or system may thus add one or more additional stall conditions in response to the removal of late bypasses. At 312A, the process or module 302 may delay a cycle or relax one or more timing requirements or constraints for one or more late bypass routes by converting late bypasses to other stages into early bypasses of the following stage in the instruction pipeline. In these embodiments, these bypass routes still exist in the design but are delayed a cycle with relaxed timing requirements. At 314A, the process or module 302 may add a cycle to the output operands of the register file whose late bypasses are removed.

Figure 3B:
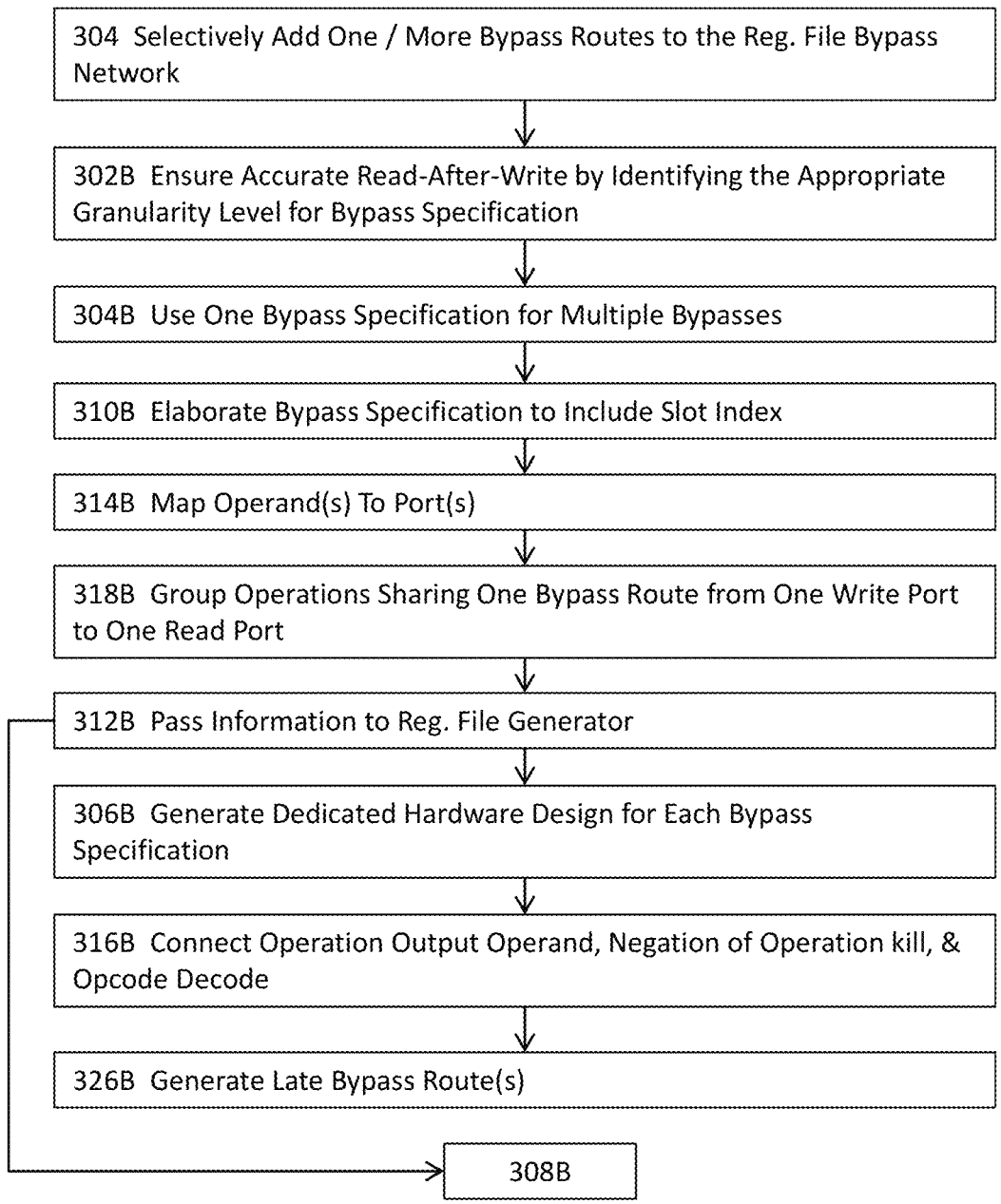
FIGS. 3B-C jointly illustrate a more detailed flow diagram for a processor module illustrated in FIG. 3 for implementing a microprocessor with a selective register file bypass network in some embodiments.
Figure 3C:
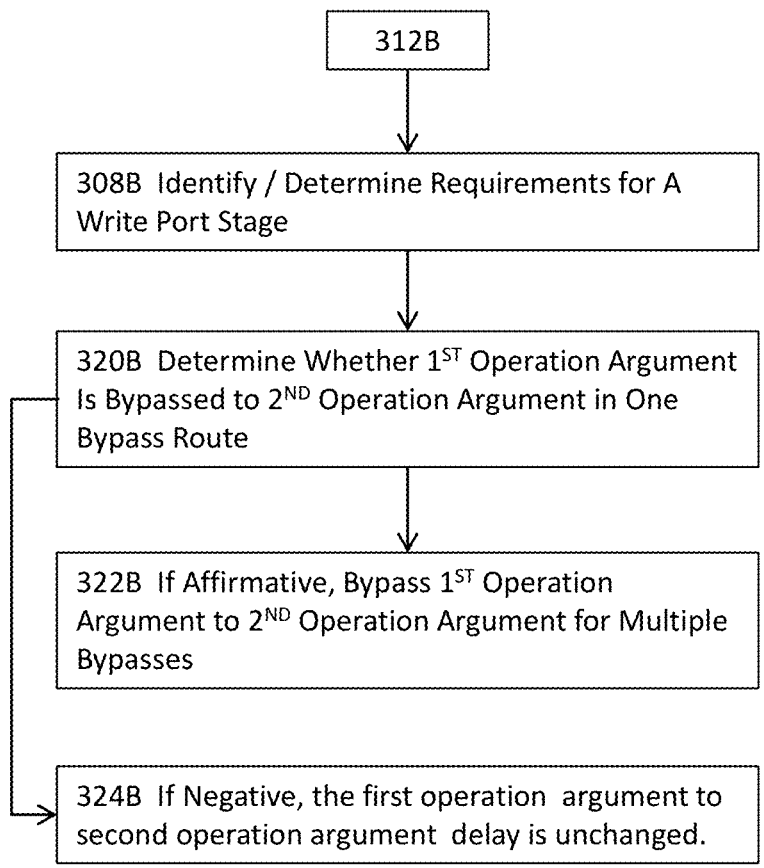

FIGS. 3B-C jointly illustrate a more detailed flow diagram for a processor module illustrated in FIG. 3 for implementing a microprocessor with a selective register file bypass network in some embodiments. More specifically, FIGS. 3B-C illustrate more details about the process or module 304 for selectively adding one or more bypasses to the register file bypass network In these embodiments illustrated in FIG. 3B-C, the process or module 304 may ensure accurate read-after-write by identifying the appropriate granularity level for bypass specification at 302B. The description of reference numerals 302B, 304B, 310B, 314B, 318B, and 312B in FIG. 3B illustrate the common acts or tasks for both the software tools (e.g., software tools 208 of FIG. 2A) for implementing a microprocessor with a selective register file bypass network and the hardware design (e.g., hardware design 210 of FIG. 2A). The description of reference numerals 306B, 316B, and 326B illustrates the tasks or acts for the hardware designs (e.g., hardware design 210 of FIG. 2A), while the description of reference numerals 308B, 320B, 322B, and 324B illustrate the tasks or acts for the software tools for implementing a microprocessor with a selective register file bypass network.

In some embodiments where the compiler may not have the slotting information (e.g., instruction slotting information used for deciding which of the next instructions may be issued or for steering an instruction to a proper functional or execution unit) for the operations when scheduling the operations, the appropriate granularity level for specifying a bypass may include the tuple (operation, argument)→(operation, argument) to ensure accurate read-after-write delay information even though the appropriate granularity level to specify the bypass on the hardware side may include the tuple pair (operation, argument, slot-index) (operation, argument, slot-index).

At 304B, the process or module may identify a bypass specification that corresponds to multiple bypasses in the register file and use the bypass specification for these multiple bypasses without having to create or use more than one bypass specification for the multiple bypasses in some embodiments. As an illustrative example, if a bypass is specified as "regbypass {oper1, arg1} {oper2, arg2}" in the complier, where "oper1" is referenced in two slot indices (0, 1), and "oper2" is referenced in two slot indices (1, 2). The aforementioned bypass specification indicates four bypasses: "from slot index 0 to slot index 1", "from slot index 0 to slot index 2", "from slot index 1 to slot index 1", and "from slot index 1 to slot index 2". In this illustrative example, the process or module 304 may use the bypass specification for the four bypasses indicated above. An illustrative bypass specification and register file bypass construct are provided above with reference to reference numeral 304 of FIG. 3.

At 310B, the compiler may elaborate the two-tuple in the bypass specification, which includes the tuple (operation, argument)→(operation, argument), to include the corresponding slot index information in the two-tuple. That is, the compiler elaborates the two-tuple of a bypass specification into (operation, argument, slot-index) (operation, argument, slot-index) that represents the appropriate granularity level on the hardware side to ensure accurate read-after-write delay information. The compiler (e.g., the compiler 222 in FIG. 2A or compiler 270B in FIG. 2B) may further map one or more operands to one or more ports at 314B.

The process or module may further invoke the compiler to group a plurality of operations that share one bypass from one write port stage to one read port stage at 318B in some embodiments. By grouping the plurality of operations sharing the same bypass, the compiler may thus generate the information or data for the bypass network and forward the information or data to the processor generator (e.g., the processor generator 206 of FIG. 2A or 206B of FIG. 2B) to generate the hardware design for the bypass network with the bypass shared among the plurality of operations in these embodiments.

At 312B, the process or module 304 may further invoke the compiler to pass information of the register file to the register file generator. For example, the compiler may transmit the following information to the register file generator as described above with reference to reference numeral 306 of FIG. 3:

BYPASS=>[
 {NAME=>"%s",
 WIDTH=>%d,
 FROM=>"%s",
 FROM_STAGE=>%d,
 TO=>"%s",
 TO_STAGE=>%d,
 },
 {NAME=>"%s",
 WIDTH=>%d,
 FROM=>"%s",
 FROM_STAGE=>%d,
 TO=>"%s",
 TO_STAGE=>%d,
 },
],

The description of reference numerals 306B, 316B, and 326B illustrates the tasks or acts for the hardware designs (e.g., hardware design 210 of FIG. 2A). At 306B, the process or module 304 may invoke the compiler (e.g., the compiler 222 in FIG. 2A or compiler 270B in FIG. 2B) to pass the information of the register file to the register file generator to generate dedicated hardware design for each bypass specification. In these illustrated embodiments, the process or module 304 may or may not take advantage of free-riders when generating the dedicated hardware design. More details about free-riders are described above with reference to reference numeral 306 of FIG. 3.

In generating the hardware design, the compiler (e.g., the instruction set extension compiler) may connect the operation output operand, the negation of operation kill, and the opcode decode. For example, the compiler may further connect an operation output operand to wr<x>_data_C<y>, connect the negation of the operation to the operation output kill to wr<x>_<id>_wen_C<y>, and connect the opcode decode to wr<x>_<id>_def<y>_C0 at 316B. In the above signals, <x> denotes the register file port name; <id> denotes the bypass identification number (e.g., group number); and <y> denotes the register file port stage number. The compiler may then generate the hardware design for the late bypass routes at 326B.

The description of reference numerals 308B, 320B, 322B, and 324B illustrate the tasks or acts for the software tools for implementing a microprocessor with a selective register file bypass network. The process or module 304 may further identify or determine one or more requirements for a write port stage at 308B. In some of these illustrated embodiments, the one or more requirements may include, for example, the following arguments for each bypass whose source comes from a write port stage: wr<x>_data_C<y>, wr<x>_def<y>_C0", "wr<x>_wen_C<y>", "wr<x>_<bypass_id>_data_C<y>", "wr<x>_<bypass_id>_def<y>_C0", and "wr<x>_<bypass_id>_wen_C<y>". In some embodiments where the process or module determines that one or more aforementioned arguments are missing, the process or module 308B may invoke the compiler (222 of FIG. 2A or 270B of FIG. 2B) to add these one or more missing arguments to a write port stage of a register file.

The process or module may further determine whether the first operation argument is bypassed to a second operation argument in one bypass route at 320B. In some embodiments where it is determined that the first operation argument is determined at 320B not to be bypassed to the second operation argument, the first operation argument to second operation argument delay is unchanged at 324B. The process or module may invoke the compiler (e.g., the instruction set extension compiler) to pass the information or data of the bypass network to the processor generator or more specifically the register file generation module therein, which in turn generates, among other things, the hardware design for the bypass network with selective bypasses as identified or determined above.

If it is determined that a first operation argument of a first operation may be bypassed to a second operation argument of a second operation in one bypass route at 320B, the process or module 304 may then bypass the first operation argument to the second operation argument in a plurality of bypasses at 322B. In these embodiments, if a former operation argument is bypassed to a latter operation argument in one bypass route, the former operation argument is bypassed to the later operation argument in the plurality of bypass routes.

In some of these illustrated embodiments, the register file generation module generates the bypass network by using the specified bypass information or data in the read port, instead of the original data without the bypass specification. In these embodiments, once the compiler receives and elaborates the bypass specification and sends the compiled information or data to the register file generator, the register file generator uses the information passed from the compiler to generate, among other things, dedicated hardware design components for the bypass specification in these embodiments. For example, the register file generator may generate the late bypasses by replacing the original data value for the output operand, the enable signal, and the def signal such as wr<x>_data_C<y>, wr<x>_wen<C<y>, and wr<x>_def<y>_C0 with the specified bypass in the read port—wr<x>_<id>_data_C<y>, wr<x>_<id>_wen<C<y>, and wr<x>_<id>_def<y>_C0, respectively. In these embodiments, the register file generator creates the one or more specified bypasses in the register file bypass network, rather than creating a full bypass network.

Figure 3D:
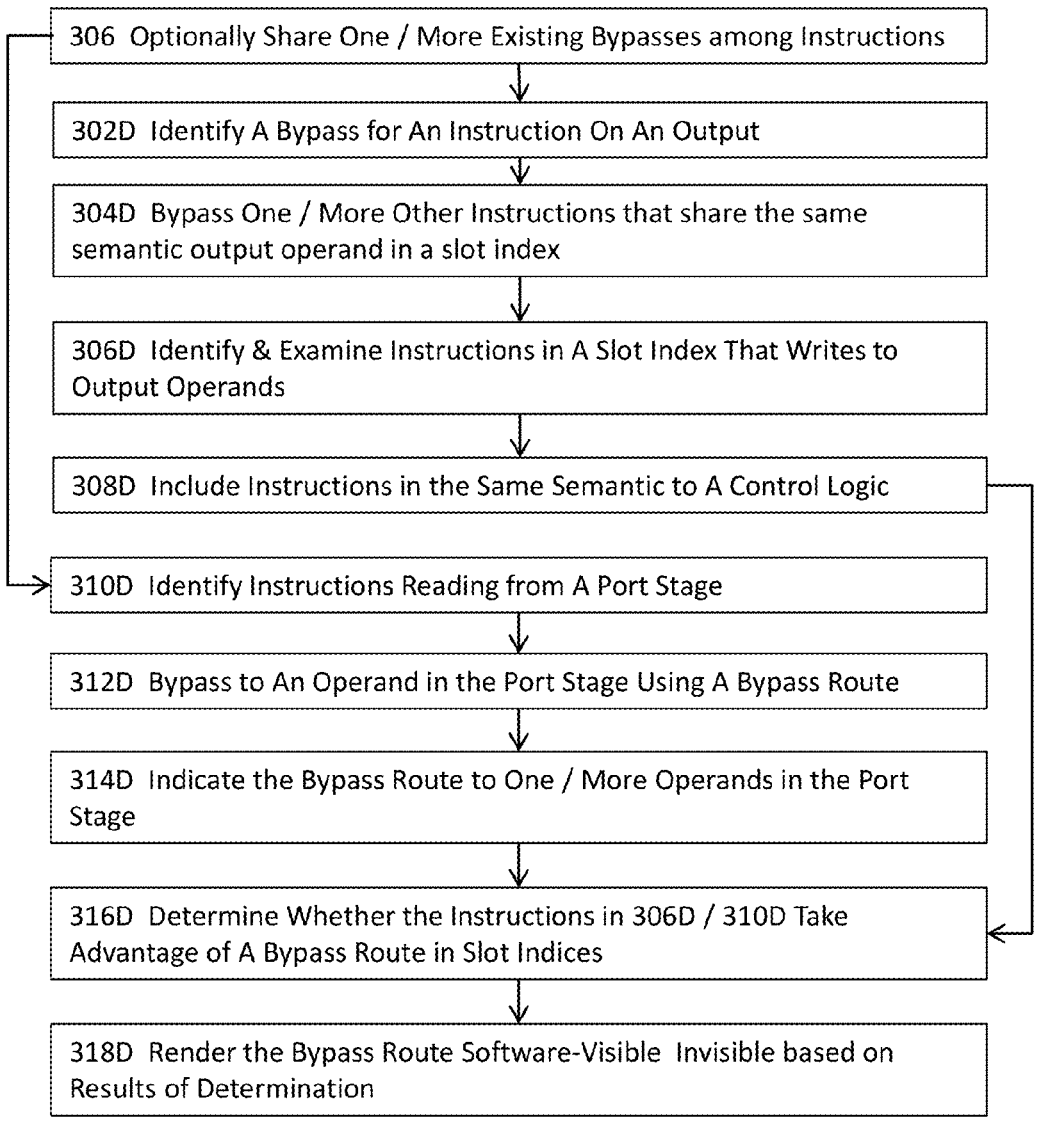
FIG. 3D illustrates a more detailed flow diagram for a processor module illustrated in FIG. 3 for implementing a microprocessor with a selective register file bypass network in some embodiments.

FIG. 3D illustrates a more detailed flow diagram for a processor module illustrated in FIG. 3 for implementing a microprocessor with a selective register file bypass network in some embodiments. More specifically, FIG. 3D illustrates more details about the process or module 306 of FIG. 3. In these illustrated embodiments, the process or module 306 may invoke a compiler (e.g., the compiler 222 of FIG. 2A or compiler 270B of FIG. 2B) to determine or specify a bypass for an instruction on an output at 302D and bypass one or more other instructions that share the same semantic output operand in a slot index with the determined or specified bypass at 304D. In these embodiments, the process or module 306 may determine that a semantic output is shared among a plurality of instructions and thus specify a bypass for the plurality of instructions sharing the same semantic output such that the bypass for the plurality of instructions only needs to be specified once, while the plurality of instructions may leverage the bypass without additional bypass specification or hardware cost.

In some of these embodiments, the process or module 302D may invoke the compiler to specify the same bypass for all the instructions sharing the same semantic output. In sharing a bypass among a plurality of instructions within the context of the same semantic, the process or module 306 may further identify and examine a plurality of instructions in the semantic in a slot index that writes to the output operands at 306D and generate the control logic accordingly at 308D. In some of these embodiments where the plurality of instructions share the same semantic, the compiler may include the plurality of instructions in or associate the plurality of instructions with the control signal (e.g., wr<n>_<id>_def<y>_C0) at 308D because the output operand and the enable signal are already available. In these embodiments, the same data value for the output and the enable signal for the output operand may be used for the plurality of instructions.

Actions 310D through 314D describe some illustrative, optional approach for bypassing to an operand in a port stage. At 310D, the process or module 306 may optionally identify a plurality of instructions reading from a port stage. In some of these illustrated embodiments, the process or module may invoke the compiler to elaborate or calculate the plurality of instructions that read from the port stage of interest. The process or module 306 may further bypass to an operand in the port stage using an identified bypass at 312D and indicate the bypass to one or more other operands in the read port stage at 314D such that these one or more other operands in the port stage may also share the identified bypass.

In these illustrated embodiments, the process or module 306 may utilize a bypass route that already exists to one port stage due to one operand in one or more other operands in the port stage with no additional cost or hardware because the compiler (e.g., the compiler 222 of FIG. 2A or the compiler 270B of FIG. 2B) needs to generate the control signal (e.g., rd<x>_use<y>_C0 signal), which is required whether or not a bypass exists, to indicate the same bypass to these one or more other operands in the port stage. In these embodiments, the compiler generates the control signal and pipe down the control signal to the following instruction pipeline stages without incurring any additional hardware cost (e.g., additional area on silicon, etc.)

At 316D, the process or module 306 may check whether the instructions determined above may take advantage of the bypass in some or all slot indices by determining whether the instructions identified or determined at 306D and/or 310D may take advantage of the bypass route in some or all slot indices. If it is determined that the instructions identified or determined at 306D and/or 310D may take advantage of the bypass route in some or all slot indices, the process or module 306 may render the bypass route software-visible at 318D. Otherwise, the process or module 306 may render the bypass route software-invisible at 318D.

Figure 3E:
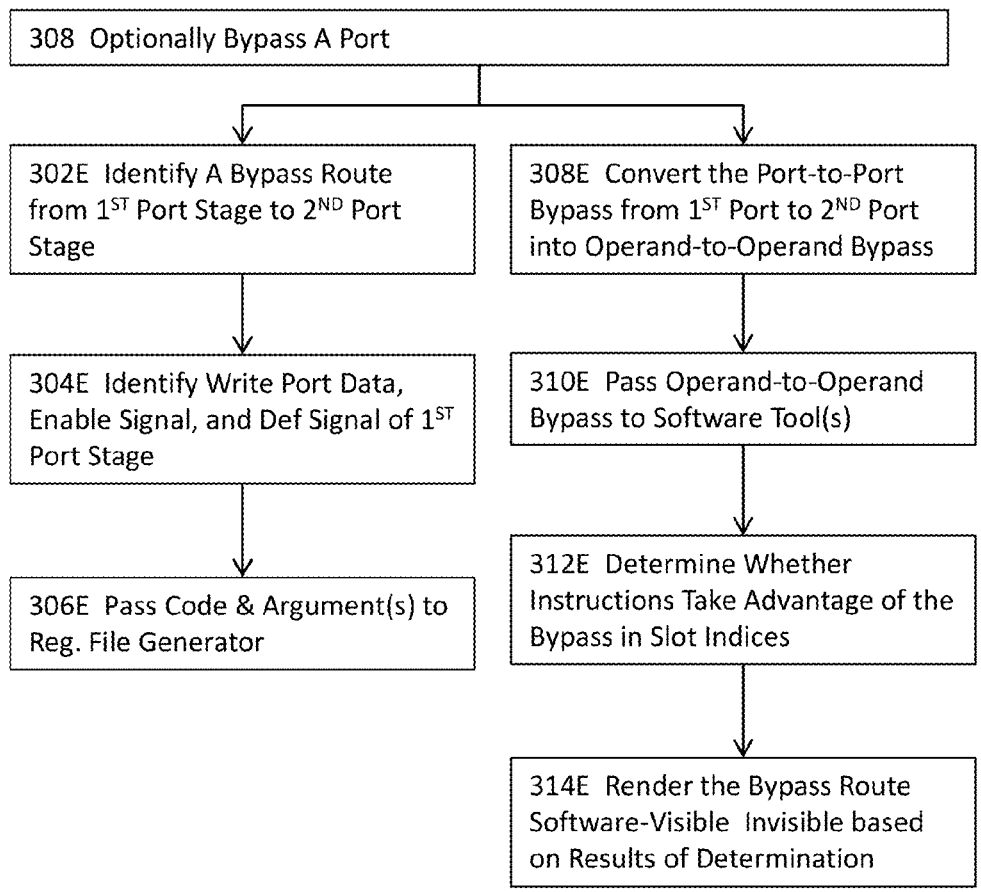
FIG. 3E illustrates a more detailed flow diagram for a processor module illustrated in FIG. 3 for implementing a microprocessor with a selective register file bypass network in some embodiments.

FIG. 3E illustrates a more detailed flow diagram for a processor module illustrated in FIG. 3 for implementing a microprocessor with a selective register file bypass network in some embodiments. More specifically, FIG. 3E illustrates more details about the process or module 308 of FIG. 3 where an entire port stage is bypassed to another port stage. One of the advantages of bypassing an entire port stage is to save area on silicon. For example, no dedicated or separate data, enable signals, or def signals need to be created That is, the compiler does not generate separate bypass output data, the enable signal, or the def signal for each bypass route but simply pass the output data, the enable signal, and the def signal for the first port stage to the register file generation module which in turn uses the output data, enable signals, and def signals passed from the compiler to bypass accordingly. Moreover, there is no need for a separate multiplexer for the output data, the enable signals, and the def signals when an entire port stage is bypassed to another port stage. In some embodiments, the method or system analyzes the timing performance or top frequency of the processor design to determine whether or not a port stage is to be bypassed.

In these illustrated embodiments, the process or module 308 may invoke the compiler (e.g., the compiler 222 of FIG. 2A or compiler 270B of FIG. 2B) to identify a bypass from a first port stage to a second port stage at 302E and identify the write port data, the enable signal, and the def signal of the first port at 304E. The process or module 308 may further create a construct to bypass from the first port to the second port at 306E. In some of these embodiments, the process or module may invoke the compiler to pass code and one or more arguments to the register file generation module to generate the hardware design for the register file including the register file bypass network at 306E. For example, the following construct may be generated to specify a bypass from a write port stage to a read port stage:

regbypass <regname>{<write port name>, <write port stage>} {<read port name>, <read port stage>}

In the above illustrative construct, the specification {<write port name>, <write port stage>} indicates the port stage to be bypassed from, and the specification {<read port name>, <read port stage>} indicates the port stage to be bypassed to.

In some embodiments where the method or system determines to bypass a write port stage to a read port stage, the method or system may invoke the compiler to pass the original write port data, the enable signals, and the def signals in the bypass to the register file generation module, without passing the bypass data (e.g., we<x>_data_C<y>), the enable signals (e.g., wr<x>_wen_C<y>), and the def signals (e.g., wr<x>_def<y>_C0) separately to the register file generation module. In some of these embodiments, the compiler may pass the following bypass information or data to the register file generation module to generate the hardware design for the at least a part of the register file as described in reference numeral 308 of FIG. 3:

BYPASS=>[
  {NAME=>"%s",
  WIDTH=>%d,
  FROM=>"%s",
  FROM_STAGE=>%d,
  TO=>"%s",
  TO_STAGE=>%d,
  PORT_BYPASS=>1,
  },
]

In the above illustrative information or data passed from the compiler to the register file generation module, the compiler adds the "PORT_BYPASS" argument to the bypass specification.

In some of these illustrated embodiments, the process or module may invoke the same compiler to convert the port-to-port bypass from a first port stage to a second port stage into an operand-to-operand bypass at 308E and pass the operand-to-operand bypass information to one or more tools (e.g., the one or more tools 208, 210, or 212 of FIG. 2A or the tools 208B, 224B, or 242B of FIG. 2B) at 310E to perform their respective functions. The process or module 308 may further optionally check some pertinent instructions to determine whether these pertinent instructions take advantage of the bypass identified at 302E or 308E.

At 312E, the process or module may invoke the compiler to determine whether or not the pertinent instructions take advantage of the identified port-to-port bypass or the converted operand-to-operand bypass. In some of these embodiments where the process or module 308 determines that these pertinent instructions do take advantage of the bypass in some or all slot indices, the process or module 306 may render the bypass route software-visible at 314E. Otherwise, the process or module 306 may render the bypass route software-invisible at 314E.

Figure 4:
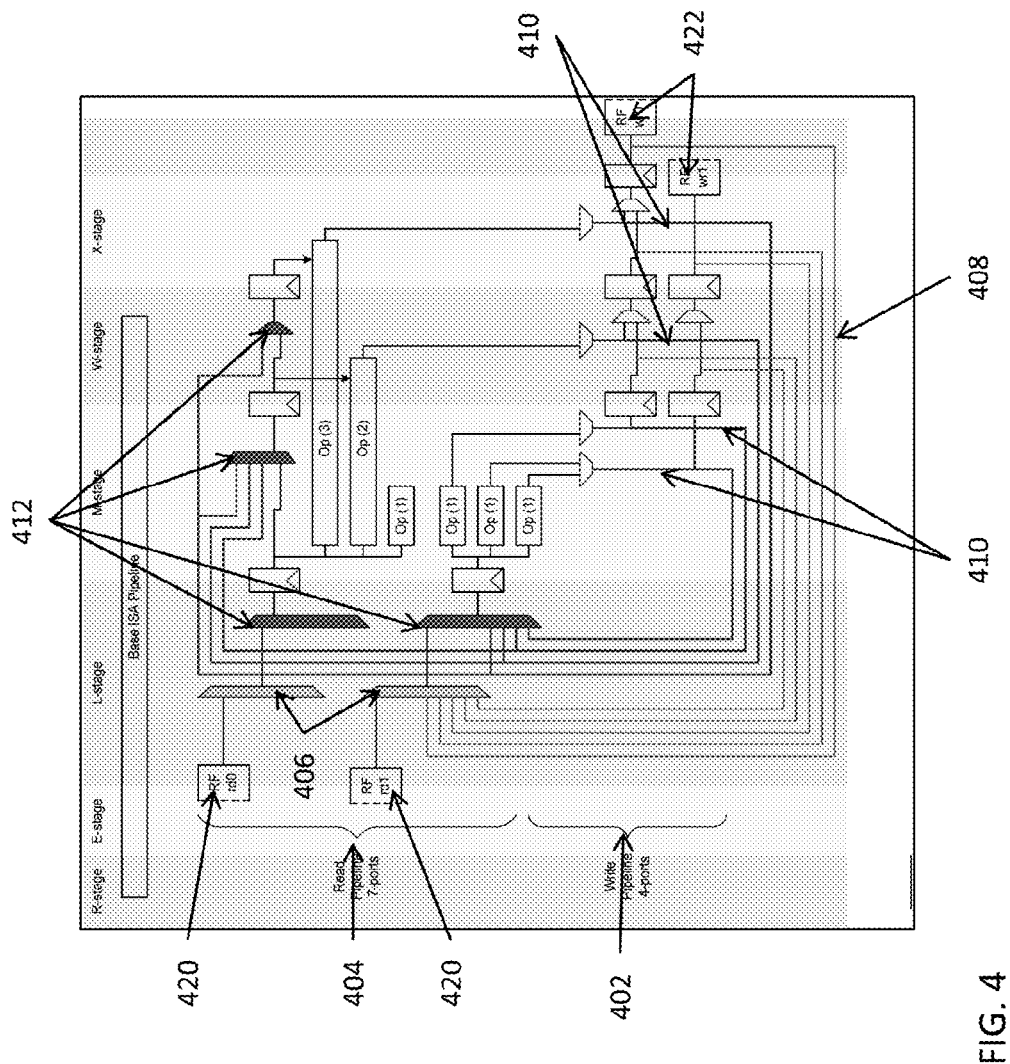
FIG. 4 illustrates a portion of a simplified register file bypass network of a microprocessor having a full bypass network in some embodiments.

FIG. 4 illustrates a portion of a simplified register file bypass network of a microprocessor having a full bypass network in some embodiments. More specifically, FIG. 4 illustrates a simplified bypass network that includes the read pipeline having one (1) port 404 including multiple stages and receiving register file entries 420 ($rd_n$, n=1 and 2) and the write pipeline having two (2) ports having multiple stages 402. Reference numeral 422 represents written register file entries through the signal $wr_n$, wherein n=1 and 2. The full bypass network includes two bypass multiplexers 406.

The full bypass network also includes additional multiplexers 412 for late bypasses 410. Moreover, "Op(n)" in FIG. 4 represents operations of n-cycle latency. For example, Op(1) represents operations of 1-cycle latency; Op(2) represents operations of 2-cycle latency; and Op(3) represents operations of 3-cycle latency. Reference numerals 408 represents the commit point, and the schematic level traces 410 represents late bypasses of the simplified register file bypass network.

Figure 5:
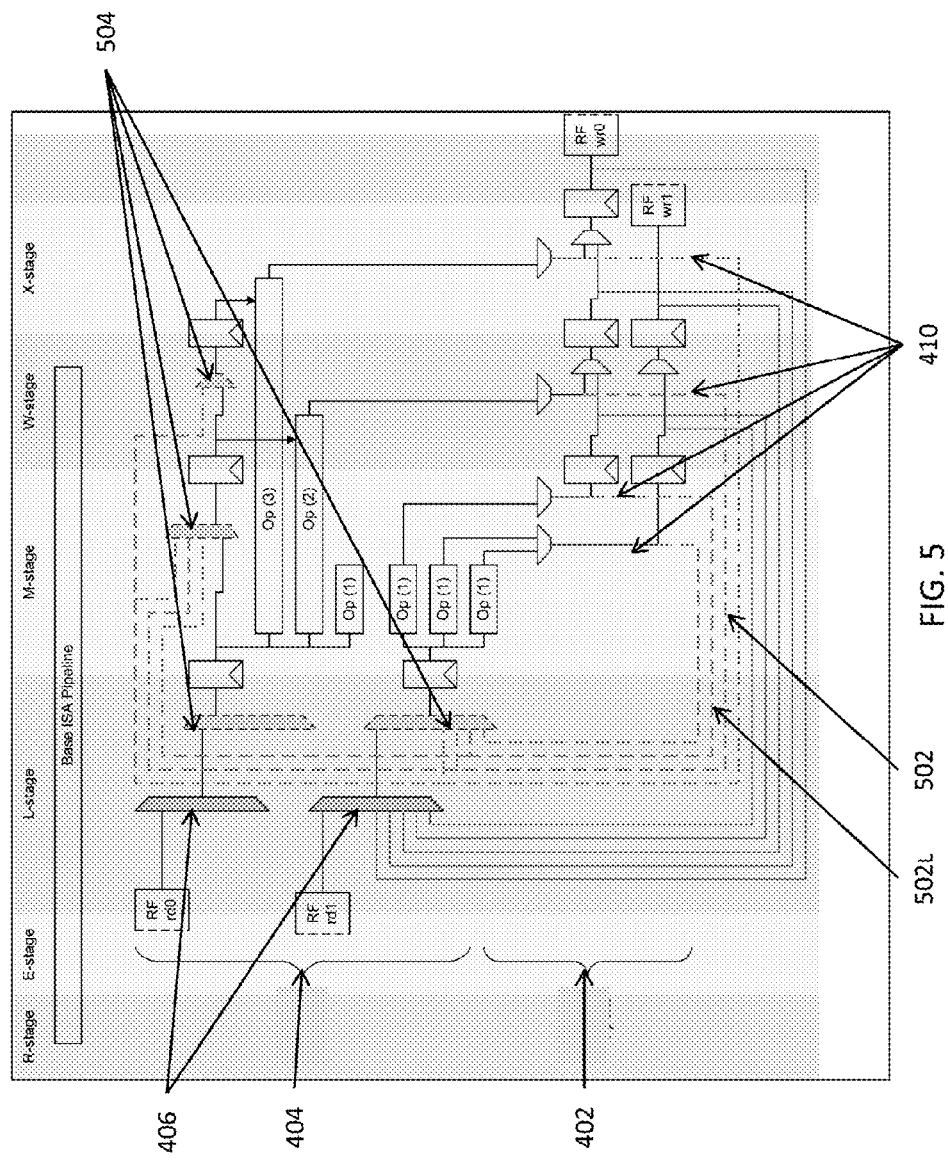
FIG. 5 illustrates the same portion of the simplified register file bypass network of the microprocessor with late bypass routes removed from the full bypass network illustrated in FIG. 4 in some embodiments.
Figure 5A:
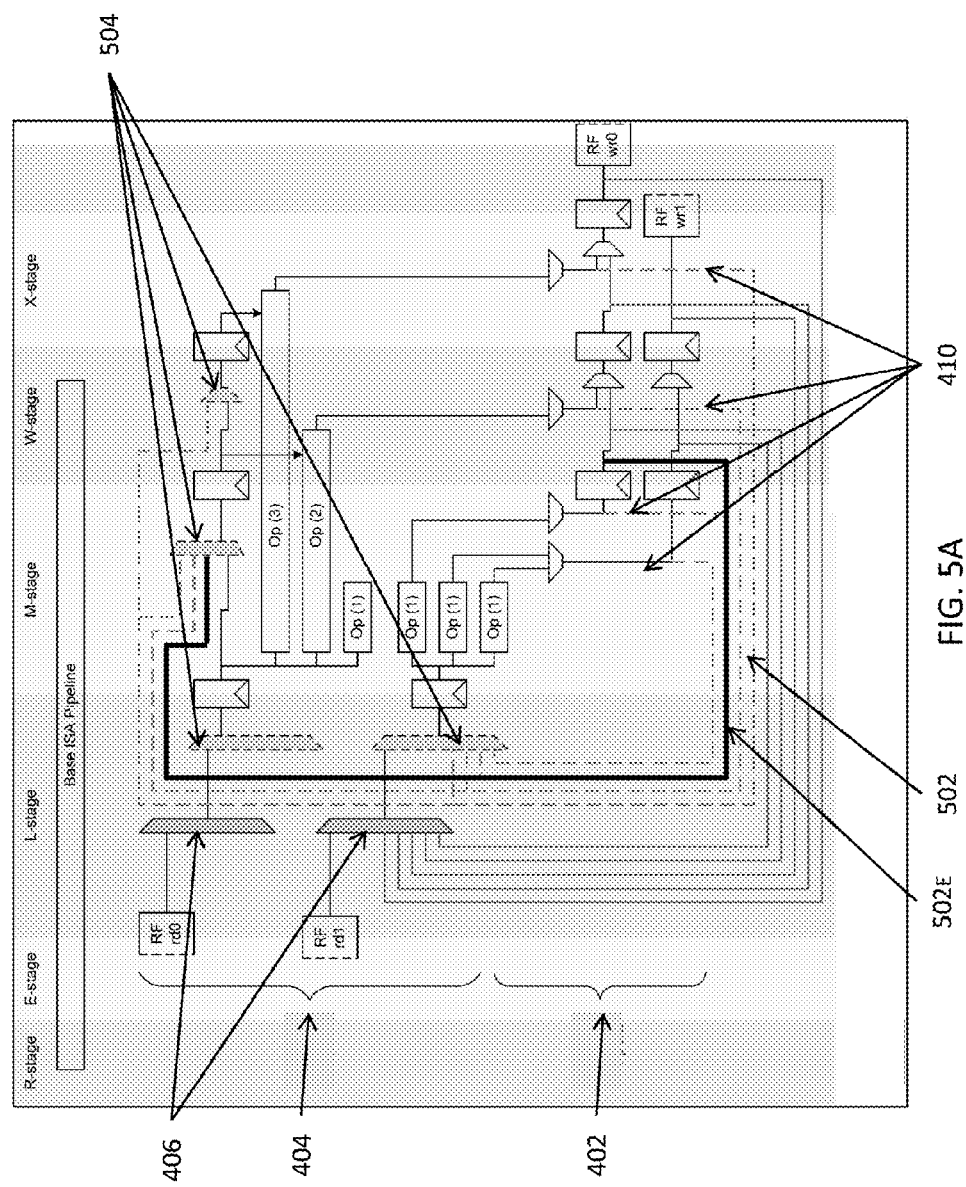
FIG. 5A illustrates the same portion of the simplified register file bypass network with the addition of an early bypass to a non-first-stage read pipeline of the microprocessor illustrated in FIGS. 4-5.

FIG. 5 illustrates the same portion of the simplified register file bypass network of the microprocessor with late bypass routes removed from the full bypass network illustrated in FIG. 4 in some embodiments. More specifically, FIG. 5 shows the bypass network in which all the late bypasses 502 (or reference numeral 410 in FIG. 4) and the corresponding multiplexers 504 (or reference numeral 412 in FIG. 4) in the bypass network have been removed from the simplified register file bypass network. More specifically, late bypass $502_L$ (where the subscript "L" indicates this bypass to be a late bypass) in the late bypasses 502 has been removed in an identical or substantially similar manner as that described in, for example, reference numeral 302 of FIG. 3 above. FIG. 5A illustrates the same portion of the simplified register file bypass network of the microprocessor illustrated in FIGS. 4-5. More specifically, FIG. 5A illustrates the addition of an early pass $502_E$ (wherein the subscript "E" indicates that the bypass is an early bypass) to a non-first-state read pipeline in response to the removal of the late bypass $502_L$ by using the techniques described in, for example, FIG. 3.

Figure 6:
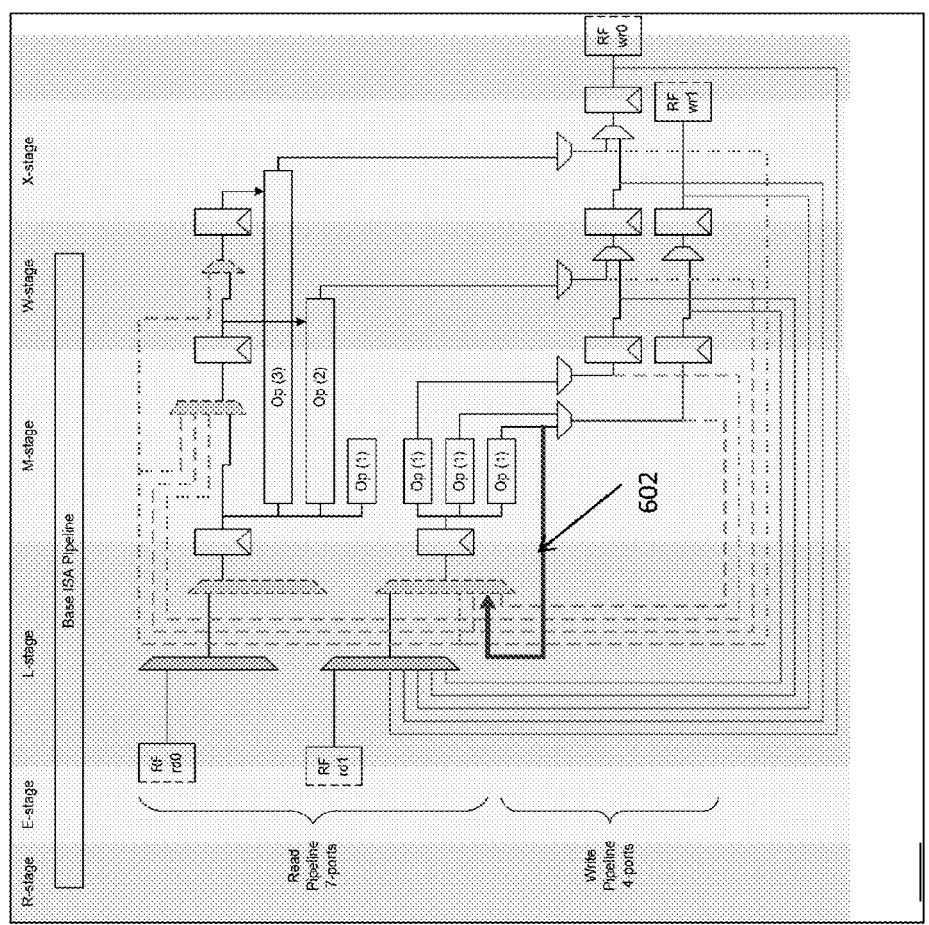
FIG. 6 illustrates the same portion of the simplified register file bypass network of the microprocessor with some late bypass routes removed from and one or more late bypass routes selectively added into the bypass network illustrated in FIGS. 4 and 4A in some embodiments.

FIG. 6 illustrates the same portion of the simplified register file bypass network of the microprocessor with some late bypass routes removed from and one or more late bypass routes selectively added into the bypass network illustrated in FIG. 4 in some embodiments. Compared to the bypass network illustrated in FIG. 5, the bypass network now includes the schematically illustration of the late bypass 602 which is added back by using some embodiments described above with reference to FIGS. 3-3E. The output of the operation (Op(1)) during the memory access stage (the M-stage in FIGS. 4-6) is bypassed to the read port stage or the load stage (L-stage in FIGS. 4-6) before the output of the operation Op(1) is committed.

SYSTEM ARCHITECTURE OVERVIEW

Figure 7:
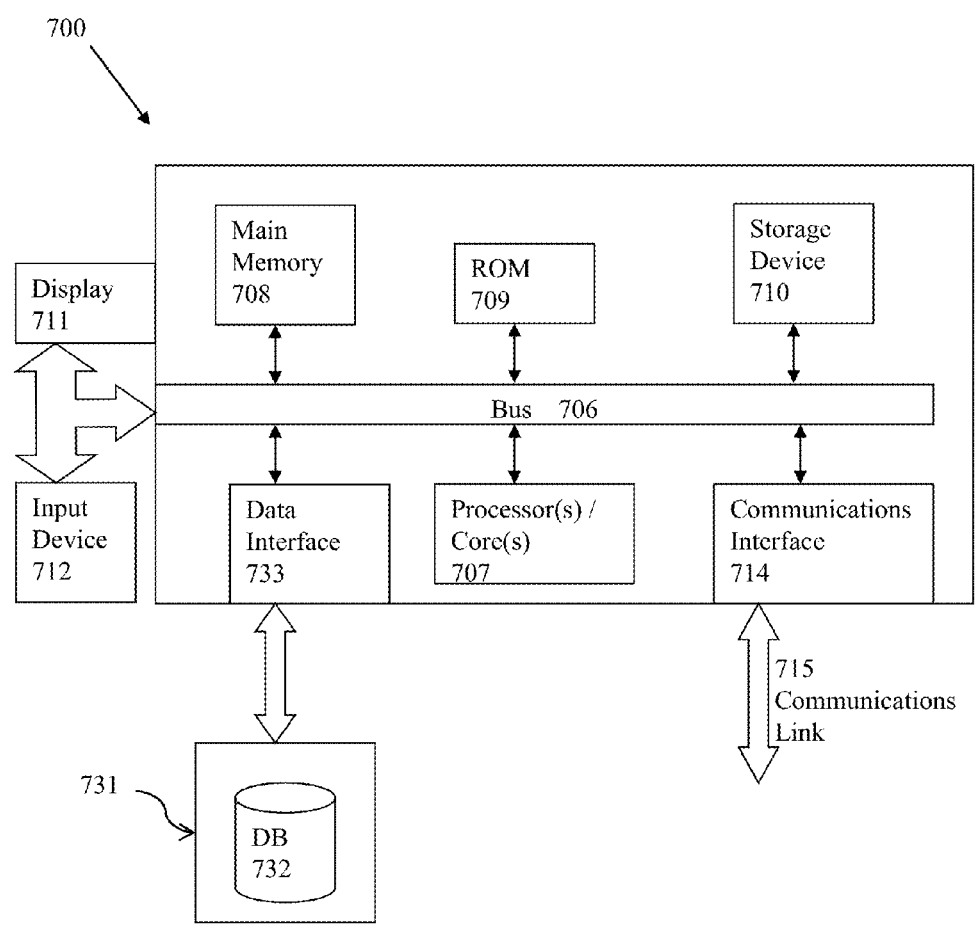
FIG. 7 illustrates a computerized system on which a method for implementing a microprocessor with a selective register file bypass network may be implemented.

FIG. 7 illustrates a block diagram of an illustrative computing system 700 suitable for enhancing manufacturability of electronic designs for multi-exposure lithography as described in the preceding paragraphs with reference to various figures. Computer system 700 includes a bus 706 or other communication mechanism for communicating information, which interconnects subsystems and devices, such as processor 707, system memory 708 (e.g., RAM), static storage device 709 (e.g., ROM), disk drive 710 (e.g., magnetic or optical), communication interface 714 (e.g., modem or Ethernet card), display 711 (e.g., CRT or LCD), input device 712 (e.g., keyboard), and cursor control (not shown).

According to one embodiment, computer system 700 performs specific operations by one or more processor or processor cores 707 executing one or more sequences of one or more instructions contained in system memory 708. Such instructions may be read into system memory 708 from another computer readable/usable storage medium, such as static storage device 709 or disk drive 710. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 707, where the one or more processors, one or more processor cores, or combination thereof executes one or more threads. For example, the act of specifying various net or terminal sets or the act or module of performing verification or simulation, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 707 for execution. Such a medium may take many forms, including but not limited to, non-volatile media and volatile media. Non-volatile media includes, for example, optical or magnetic disks, such as disk drive 710. Volatile media includes dynamic memory, such as system memory 708. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 700. According to other embodiments of the invention, two or more computer systems 700 coupled by communication link 715 (e.g., LAN, PTSN, or wireless network) may perform the sequence of instructions required to practice the invention in coordination with one another.

Computer system 700 may transmit and receive messages, data, and instructions, including program, i.e., application code, through communication link 715 and communication interface 714. Received program code may be executed by processor 707 as it is received, and/or stored in disk drive 710, or other non-volatile storage for later execution. In an embodiment, the computer system 700 operates in conjunction with a data storage system 731, e.g., a data storage system 731 that includes a database 732 that is readily accessible by the computer system 700. The computer system 700 communicates with the data storage system 731 through a data interface 733. A data interface 733, which is coupled to the bus 706 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 733 may be performed by the communication interface 714.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing a microprocessor with a selective register file bypass network, comprising:
   removing late bypasses from a register file bypass network of a microprocessor design;
   automatically adding one or more late bypasses, which are a smaller subset of the late bypasses removed, to the register file bypass network based in part upon analysis results of a plurality of instructions to be executed by the microprocessor; and
   generating an electronic design for at least the register file bypass network with the one or more late bypasses that are automatically added to the register file bypass network to reduce an area on silicon occupied by the electronic design or to improve performance of the microprocessor design.

2. The computer implemented method of claim 1, further comprising:
   automatically adding one or more early bypasses to the electronic design;
   automatically transmitting information that includes the one or more early bypasses and indicates that the electronic design includes no late bypasses by using a register file specification from a compiler to a register file generation module;
   automatically adding stall logic in response to the information indicating that the electronic design includes no late bypasses; and
   automatically generating or modifying the electronic design to include no bypasses by using at least the information with the register file generation module.

3. The computer implemented method of claim 2, further comprising:

adding a first cycle or relaxing timing requirements for a removed late bypass route by converting the removed bypass route to at least a first instruction pipeline stage to an early bypass of a second instruction pipeline stage, wherein the first instruction pipeline stage precedes the second instruction pipeline stage.

4. The computer implemented method of claim 3, further comprising:

adding a second cycle to one or more output operands of at least some of the plurality of instructions, wherein the one or more output operands correspond to one or more late bypasses of the late bypasses that have been removed.

5. The computer implemented method of claim 1, further comprising:

identifying a first granularity level for specifying the one or more late bypasses; and sharing a first bypass specification for specifying a first bypass of the one or more late bypasses with at least another bypass, wherein the one or more late bypasses comprise multiple late bypasses that include the at least another bypass.

6. The computer implemented method of claim 5, further comprising:

determining a plurality of requirements for a first port stage of a register file of the microprocessor based at least in part upon the first bypass specification, wherein the first port stage includes a write port stage;

elaborating the first bypass specification at the first granularity level to include information of one or more slot indices; and mapping one or more operands to one or more ports of the register file.

7. The computer implemented method of claim 6, further comprising:

for a first bypass in the first bypass specification, connecting a first operation operand, negation of an operation output kill, and an opcode decode to respective signal sources;

determining whether or not a first operation argument is bypassed to a second operation argument in one bypass of the one or more late bypasses to generate determination results; and modifying the electronic design based at least in part upon the determination results.

8. The computer implemented method of claim 1, further comprising:

sharing at least one bypass of the one or more late bypasses among a plurality of free-riders.

9. The computer implemented method of claim 8, further comprising:

identifying a first set of instructions in a semantic from the plurality of instructions in a slot index that writes to output operands; and associating the first set of instructions with a control signal while reusing the output operands and same enable signals for the some instructions.

10. The computer implemented method of claim 8, further comprising:

identifying a second set of instructions that read from a first port stage;

bypassing the second set of instructions to a first operand in the first port stage by using a first bypass of the one or more late bypasses that are automatically added to the register file bypass network; and sharing the first bypass with one or more other operands in the first port stage by indicating information about the first bypass to the one or more other operands in the first port stage.

11. The computer implemented method of claim 8, further comprising:

determining whether a first set of instructions in a semantic or a second set of instructions that read from a first port stage benefits from the at least one bypass to generate determination results; and determining whether or not the at least one bypass is software-visible based at least in part upon the determination results.

12. The computer implemented method of claim 1, further comprising:

bypassing a first port stage in the instruction pipeline of the microprocessor to a second port stage by using at least one bypass of the one or more late bypasses.

13. The computer implemented method of claim 12, further comprising:

identifying a first port bypass in the one or more late bypasses from the first port stage to the second port stage;

identifying write port data and multiple signals for the first port stage; and transmitting information or data concerning the first port bypass to a register file generation module.

14. The computer implemented method of claim 12, further comprising:

converting the first port bypass into an operand bypass that bypasses a first operand to a second operand; and transmitting information concerning the operand bypass to one or more software tools for the one or more software tools to perform their respective functions.

15. The computer implemented method of claim 12, further comprising:

determining whether a set of instructions benefits from the first port bypass to generate determination results; and determining whether or not the first port bypass is visible by the one or more software tools based at least in part upon the determination results.

16. A system for implementing a microprocessor with a selective register file bypass network, comprising:

a processor or a processor core executing one or more threads of execution of a computing system;

non-transitory computer accessible storage medium holding program code that includes a sequence of instructions that, when executed by the processor or processor core, cause the processor or processor core to at least remove late bypasses from a register file bypass network of a microprocessor design, automatically add one or more late bypasses, which are a smaller subset of the late bypasses removed, to the register file bypass network based at least in part upon analysis results of a plurality of instructions to be processed in an instruction pipeline of the microprocessor, and generate an electronic design for at least the register file bypass network with the one or more late bypasses that are automatically added to the register file bypass network to reduce an area on silicon occupied by the electronic design or to improve performance of the microprocessor design.

17. The system of claim 16, wherein the non-transitory memory holds the program code, and the program code includes further instructions that, when executed by the processor or processor core, cause the processor or processor core to share at least one bypass of the one or more late bypasses among a plurality of free-riders.

18. The system of claim 16, wherein the non-transitory memory holds the program code, and the program code includes further instructions that, when executed by the processor or processor core, cause the processor or processor core to bypass a first port stage in the instruction pipeline of the microprocessor to a second port stage by using at least one bypass of the one or more late bypasses.

19. An article of manufacture comprising a non-transitory computer accessible storage medium having stored thereupon a sequence of instructions which, when executed by at least one processor or processor core executing one or more threads, causes the at least one processor or processor core to perform a plurality of acts for implementing a microprocessor with a selective register file bypass network, the plurality of acts comprising:
- removing late bypasses from a register file bypass network of a microprocessor design;
- automatically adding one or more late bypasses, which are a smaller subset of the late bypasses removed, to the register file bypass network based at least in part upon analysis results of a plurality of instructions to be processed in an instruction pipeline of the microprocessor; and
- generating an electronic design for at least the register file bypass network with the one or more late bypasses that are automatically added to the register file bypass network to reduce an area on silicon occupied by the electronic design or to improve performance of the microprocessor design.

20. The article of manufacture of claim 19, the plurality of acts further comprising:
- sharing at least one bypass of the one or more late bypasses among a plurality of free-riders.

21. The article of manufacture of claim 19, the plurality of acts further comprising:
- bypassing a first port stage in the instruction pipeline of the microprocessor to a second port stage by using at least one bypass of the one or more late bypasses.

\* \* \* \* \*